US012459254B2

(12) United States Patent
Ishimi et al.

(10) Patent No.: US 12,459,254 B2
(45) Date of Patent: Nov. 4, 2025

(54) PRINTING APPARATUS AND CONTROL METHOD

(71) Applicant: CANON KABUSHIKI KAISHA, Tokyo (JP)

(72) Inventors: Keita Ishimi, Kanagawa (JP); Toshimitsu Danzuka, Tokyo (JP); Rie Takekoshi, Kanagawa (JP); Takao Ogata, Tokyo (JP); Akihiro Tomida, Kanagawa (JP); Akiko Aichi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 161 days.

(21) Appl. No.: 18/535,834

(22) Filed: Dec. 11, 2023

(65) Prior Publication Data

US 2024/0198664 A1 Jun. 20, 2024

(30) Foreign Application Priority Data

Dec. 16, 2022 (JP) ................................ 2022-201434

(51) Int. Cl.
*B41J 2/165* (2006.01)
*B41J 2/045* (2006.01)
*B41J 29/17* (2006.01)

(52) U.S. Cl.
CPC ........... *B41J 2/0456* (2013.01); *B41J 2/0458* (2013.01); *B41J 2/16552* (2013.01); *B41J 29/17* (2013.01); *B41J 2002/16558* (2013.01); *B41P 2235/20* (2013.01)

(58) Field of Classification Search
CPC ................................ B41J 2/0456; B41J 29/17
See application file for complete search history.

(56) References Cited

U.S. PATENT DOCUMENTS 7,287,825 B2 10/2007 Furuichi et al. ......... B41J 2/165
7,290,858 B2 11/2007 Furuichi et al. ......... B41J 2/205
8,882,232 B2 11/2014 Ibe et al. ............... B41J 29/393
(Continued)

FOREIGN PATENT DOCUMENTS

EP 1882591 A2 * 1/2008 .......... B41J 2/16585
JP 2013-169761 9/2013
(Continued)

OTHER PUBLICATIONS

Watanabe, Machine Translation of JP-2014111318-A, 2014 (Year: 2014).*
(Continued)

*Primary Examiner* — Scott A Richmond
(74) *Attorney, Agent, or Firm* — Venable LLP

(57) ABSTRACT

A printing apparatus including a printing unit configured with an ejection port surface for ejecting ink, a wiping unit configured to wipe the ejection port surface using a wiping member by relative movement with the printing unit, an application unit configured to apply a wiping liquid to the wiping member, a detection unit configured to detect the ink on the wiping member, and a control unit configured to cause the printing unit to print a predetermined pattern on a predetermined area of the wiping member and to cause the application unit to apply the wiping liquid, and, then, to cause the detection unit to detect the ink on the predetermined area.

20 Claims, 18 Drawing Sheets

(56) References Cited

U.S. PATENT DOCUMENTS

| | | | | |
|---|---|---|---|---|
| 9,114,651 | B2 | 8/2015 | Kato et al. | B41J 29/393 |
| 9,162,462 | B2 | 10/2015 | Komatsu et al. | B41J 2/165 |
| 9,561,658 | B2 | 2/2017 | Danzuka et al. | B41J 29/393 |
| 9,707,763 | B2 | 7/2017 | Nakagawa et al. | B41J 2/165 |
| 9,862,195 | B2 | 1/2018 | Genta et al. | B41J 2/165 |
| 11,247,471 | B2 | 2/2022 | Narumi et al. | B41J 2/165 |
| 2022/0305792 | A1 | 9/2022 | Ishii et al. | B41J 2/165 |
| 2022/0324233 | A1 | 10/2022 | Uetsuki et al. | B41J 2/165 |
| 2022/0388321 | A1 | 12/2022 | Takekoshi et al. | B41J 25/00 |
| 2024/0001678 | A1 | 1/2024 | Tomida et al. | B41J 2/165 |
| 2024/0010002 | A1 | 1/2024 | Takekoshi et al. | B41J 2/175 |

FOREIGN PATENT DOCUMENTS

| | | | | |
|---|---|---|---|---|
| JP | 2013169761 | A | * | 9/2013 |
| JP | 2014111318 | A | * | 6/2014 |

OTHER PUBLICATIONS

Maida, MachineTranslationofJP-2013169761-A, 2013 (Year: 2013).*
U.S. Appl. No. 18/512,995, filed Nov. 17, 2023.
U.S. Appl. No. 18/513,078, filed Nov. 17, 2023.
U.S. Appl. No. 18/535,252, filed Dec. 11, 2023.
U.S. Appl. No. 18/399,572, filed Dec. 28, 2023.

* cited by examiner

| | INK | | | |
|---|---|---|---|---|
| | 1 | 2 | 3 | 4 |
| PIGMENT DISPERSION LIQUID 1 | 30 | | | |
| PIGMENT DISPERSION LIQUID 2 | | 30 | | |
| PIGMENT DISPERSION LIQUID 3 | | | 30 | |
| PIGMENT DISPERSION LIQUID 4 | | | | 30 |
| RESIN FINE PARTICLE DISPERSION LIQUID | 32 | 32 | 32 | 32 |
| 1,2- BUTANEDIOL | 20 | 20 | 20 | 20 |
| BYK-333 | 0.5 | 0.5 | 0.5 | 0.5 |

FIG.16A

| | WIPING LIQUID |
|---|---|
| | 1 |
| TRIETHYLENE GLYCOL | 30 |
| 1,2- HEXANEDIOL | 5 |
| TRIETHANOLAMINE | 0.5 |
| ACETYLENOL E100 | 1 |

FIG.16B

| | INK | PATTERN | SENSOR | DETECTION METHOD | DETECTION OF THE AMOUNT OF RECEIVED LIGHT | NON-EJECTION DETERMINATION | INAPPROPRIATENESS DETERMINATION | INSTALLATION DETERMINATION |
|---|---|---|---|---|---|---|---|---|
| EXEMPLARY EMBODIMENT 1 | 4 | ONE LINE | FIXED POSITION | DETECTED VALUE DIFFERENCE | NOT EXECUTED | B | B | C |
| EXEMPLARY EMBODIMENT 2 | 4 | ONE LINE | FIXED POSITION | LINE THICKNESS | NOT EXECUTED | A | A | C |
| EXEMPLARY EMBODIMENT 3 | 4 | ONE LINE | FIXED POSITION | AVERAGE CONCENTRATION CHANGE | NOT EXECUTED | A | A | C |
| EXEMPLARY EMBODIMENT 4 | 4 | ONE LINE | CR MOUNTED | LINE THICKNESS | NOT EXECUTED | AA | A | C |
| EXEMPLARY EMBODIMENT 5 | 4 | MULTIPLE LINES | CR MOUNTED | LINE THICKNESS | NOT EXECUTED | AA | AA | C |
| EXEMPLARY EMBODIMENT 6 | 4 | MULTIPLE LINES | CR MOUNTED | LINE THICKNESS | EXECUTED | AA | AA | AA |
| EXEMPLARY EMBODIMENT 7 | 3 | MULTIPLE LINES | CR MOUNTED | LINE THICKNESS | EXECUTED | AA | A | AA |
| EXEMPLARY EMBODIMENT 8 | 2 | MULTIPLE LINES | CR MOUNTED | LINE THICKNESS | EXECUTED | AA | A | AA |
| EXEMPLARY EMBODIMENT 9 | 1 | MULTIPLE LINES | CR MOUNTED | LINE THICKNESS | EXECUTED | AA | A | AA |
| COMPARATIVE EXAMPLE 1 | 4 | NO LINE | FIXED POSITION | DETECTED VALUE DIFFERENCE | NOT EXECUTED | B | C | C |
| COMPARATIVE EXAMPLE 2 | 4 | MULTIPLE LINES (NARROW) | CR MOUNTED | LINE THICKNESS | NOT EXECUTED | B | C | C |

FIG.17

PRINTING APPARATUS AND CONTROL METHOD

CROSS-REFERENCE TO PRIORITY APPLICATION

This application claims the benefit of Japanese Patent Application No. 2022-201434, filed Dec. 16, 2022, which is hereby incorporated by reference herein in its entirety.

BACKGROUND OF THE INVENTION

Field of the Invention

The present invention relates to a printing apparatus that performs printing by ejecting a liquid and its control method.

Description of the Related Art

Japanese Patent Laid-Open No. 2013-169761 discloses a technology for cleaning a nozzle surface by wiping the nozzle surface in a head using a wiping member (wiping web) to which a wiping liquid (cleaning liquid) is applied. Furthermore, in the technology disclosed in Japanese Patent Laid-Open No. 2013-169761, an optical sensor is used to determine whether or not the wiping liquid is applied to the wiping member after application of the wiping liquid.

However, with the technology disclosed in Japanese Patent Laid-Open No. 2013-169761, if the amount of applied wiping liquid varies, or if the wiping member to be conveyed is not appropriately mounted, there has been a possibility that whether or not the wiping liquid is appropriately applied cannot be determined.

SUMMARY OF THE INVENTION

The present invention has been made in view of the above-mentioned problems, and provides a technology capable of detecting a state of application of a wiping liquid with high accuracy.

In a first aspect of the present invention, a printing apparatus includes: a printing unit configured with an ejection port surface for ejecting ink, a wiping unit configured to wipe the ejection port surface using a wiping member by relative movement with the printing unit, an application unit configured to apply a wiping liquid to the wiping member, a detection unit configured to detect the ink on the wiping member, and a control unit configured to cause the printing unit to print a predetermined pattern on a predetermined area of the wiping member and cause the application unit to apply the wiping liquid, and then cause the detection unit to detect the ink on the predetermined area.

In a second aspect of the present invention, a control method of a printing apparatus including a printing unit configured with an ejection port surface for ejecting ink, and a wiping unit configured to wipe the ejection port surface using a wiping member by relative movement with the printing unit, the control method including printing a predetermined pattern, by the printing unit, on a predetermined area of the wiping member, applying a wiping liquid to the wiping member after printing, and detecting the ink on the predetermined area after applying.

According to the present invention, a state of application of a wiping liquid can be detected with high accuracy.

Further features of the present invention will become apparent from the following description of exemplary embodiments with reference to the attached drawings.

BRIEF DESCRIPTION OF THE DRAWINGS

FIG. 16A and FIG. 16B are tables illustrating the compositions of ink and the wiping liquid used in experiments conducted by the inventor of the present application;

FIG. 17 is a table illustrating the results of the experiments conducted by the inventor of the present application.

DESCRIPTION OF THE EMBODIMENTS

Hereafter, with reference to the accompanying drawings, detailed explanations are given of examples of an embodiment of a printing apparatus and a control method. Note that the following embodiments are not intended to limit the present invention, and every combination of the characteristics explained in the present embodiments is not necessarily essential to the solution provided in the present invention. Further, the positions, shapes, etc., of the constituent elements described in the embodiments are merely examples and are not intended to limit the range of this invention to that of the examples.

(Configuration of the Printing Apparatus)

The printing apparatus explained in the present specification is what is termed as an inkjet printing apparatus of a serial scan type, which ejects liquid such as ink to a conveyed print medium in an inkjet system while moving in a direction intersecting (orthogonally in the present specification) the conveyance direction. Note that, in the present specification, directions are indicated using the X direction, the Y direction, and the Z direction that are orthogonal to each other. Each direction is from one side toward the other side.

Figure 1:
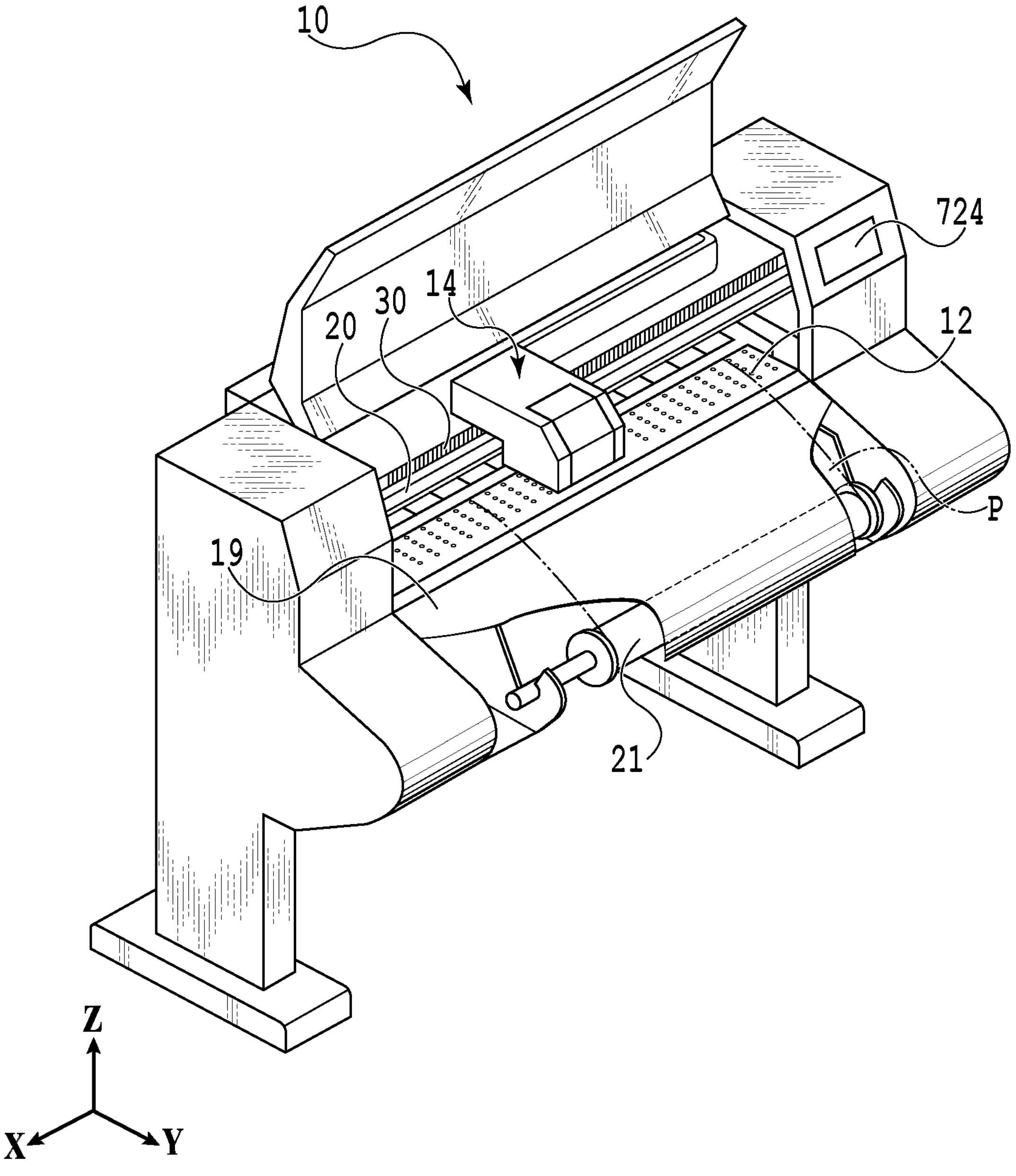
FIG. 1 is a perspective configuration diagram of a printing apparatus.
Figure 2A:
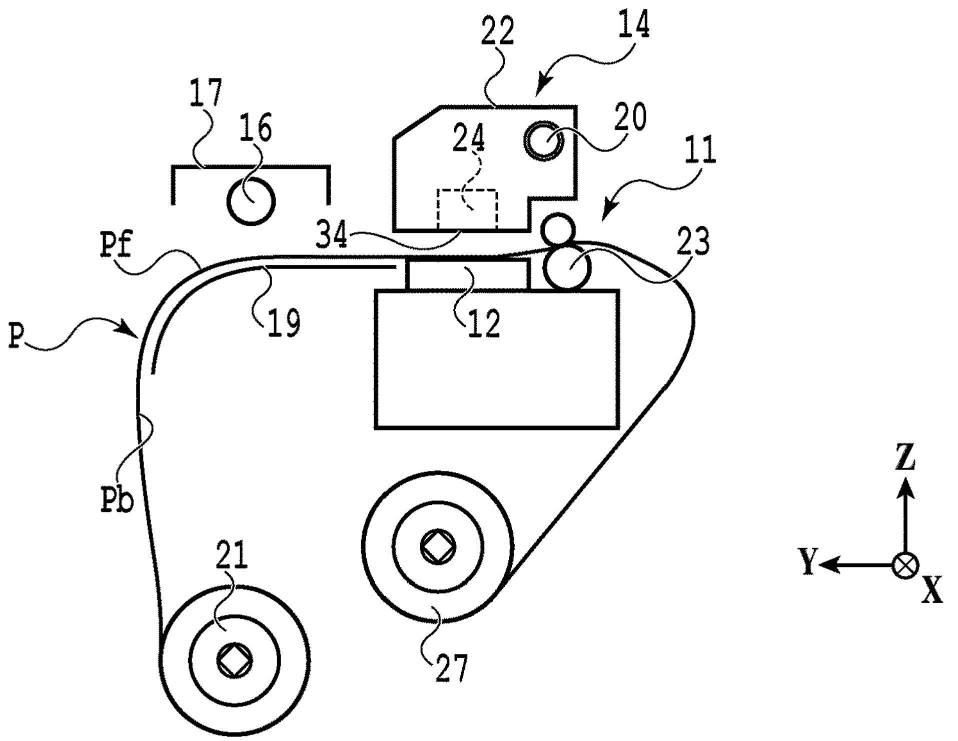
FIG. 2A and FIG. 2B are schematic configuration diagrams of the main configurations of the printing apparatus.
Figure 2B:
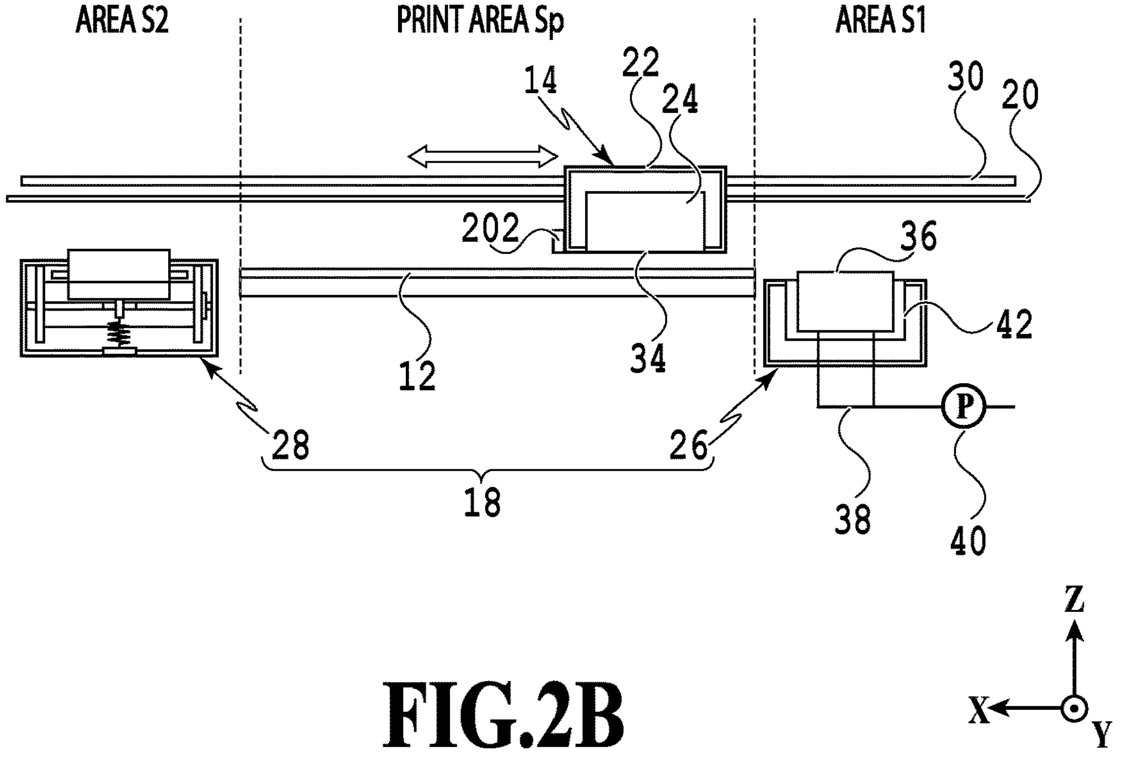

FIG. 1 is a schematic configuration diagram of the printing apparatus. FIG. 2A is a diagram for explaining a heating part in the printing apparatus, and FIG. 2B is a diagram for explaining a recovery part in the printing apparatus.

The printing apparatus 10 is equipped with the platen 12, which supports the print medium P conveyed by the conveyance part 11 (see FIG. 2A), and the printing part 14, which performs printing on the print medium P that is supported by the platen 12. Further, the printing apparatus 10 is equipped with the heating part 16 (see FIG. 2A), which heats the printing surface Pf of the print medium P after printing, and the recovery part 18 (see FIG. 2B), which is for favorably maintaining and recovering the ink ejection performance of the printing part 14. Note that the entire operation of the printing apparatus 10 is controlled by the control part 700 (which is described hereafter).

The conveyance part 11 conveys the sheet-shaped print medium P that is unwound and fed from the roll paper 27 with the conveyance roller 23, which is driven by a conveyance motor (not illustrated in the drawings) via gears, to the platen 12. The print medium P after printing is wound up by the spool 21. Note that the conveyance mechanism of the conveyance part 11 is not limited as such, and various publicly-known technologies can be used.

The printing part 14 is equipped with the carriage 22, which is installed on the guide shaft 20 in a movable manner, and the print head 24 (see FIG. 2A), which is configured to be detachably attachable to the carriage 22 to eject ink to the print medium P that is supported by the platen 12. The guide shaft 20 extends in the X direction that intersects (orthogonally in the present embodiment) the Y direction in which the print medium P is conveyed, and the carriage 22 is configured to be movable in the X direction in a reciprocating manner along the guide shaft 20. The print head 24 is equipped with the multiple ejection port arrays 302 (described hereafter) formed by arranging multiple ejection ports for ejecting ink along the Y direction, and is mounted on the carriage 22 so that the ejection port surface 34 (see FIG. 2A) on which the ejection port arrays 302 are formed faces the platen 12. Accordingly, in the printing apparatus 10, the print head 24 is configured to be capable of ejecting ink while reciprocating in the X direction. As for the specific movement mechanisms of the carriage 22, various publicly-known technologies such as a mechanism using a carriage belt or a lead screw for transmitting a driving force from a carriage motor, can be used.

In the printing apparatus 10, the scale 30 on which slits are formed at equal intervals in the X direction extends in the X direction, and the carriage 22 is equipped with a linear encoder (not illustrated in the drawings) for reading this scale 30. The linear encoder outputs a signal based on a result of reading the scale 30 to the control part 700. The control part 700 obtains the position of the print head 24 based on this signal and controls the movement of the print head 24. Further, the print head 24 is configured to eject multiple types of ink. The present embodiment has a configuration in which black (K) ink, cyan (C) ink, magenta (M) ink, and yellow (Y) ink are ejected from the print head 24. Note that the types and number of inks ejected from the print head 24 are not limited to the four inks described above.

In the printing apparatus 10, the printing part 14, i.e., the print head 24, moves at a speed of 40 inches/sec and performs printing at a resolution of 1200 dpi (1 dot per 1/1200 inches), for example. Upon a start of printing, the printing apparatus 10 moves the print head 24 to the printing start position and feeds the print medium P with the conveyance part 11 to a position where printing can be performed by the print head 24. Next, based on print data, a printing operation of ejecting ink while moving (scanning with) the print head 24 in the X direction is performed, and, upon completion of the printing operation, a conveyance operation of conveying the print medium P by a predetermined amount with the conveyance part 11 is performed. Thereafter, the printing operation is performed again. In this way, the printing apparatus 10 performs printing on the print medium P by alternately and repeatedly executing the printing operation and the conveyance operation. Note that, in the present embodiment, it is assumed to execute multipath printing, in which printing is performed by scanning with the printing part 14 multiple times for a unit area on a print medium, for example.

Further, the carriage 22 is equipped with the sensor 202 on one side or the other side in the X direction capable of detecting the concentration of ink that has adhered to an object located at a position that can face the ejection port surface 34 of the print head 24 (see FIG. 2B). That is, the sensor 202 is an optical sensor. The sensor 202 irradiates the surface of an object with R (red), G (green), and B (blue) light from a light emitting part, receives the reflected light with a light receiving part, and outputs the amount of herein-received light to the control part 700. Specifically, while the sensor 202 is moved in the X direction via the carriage 22 on the surface of an object, the R, G, and B LEDs are sequentially turned on, and the specular reflected lights are read, so that the concentration is detected from the strength ratio of the three colors. The sensor 202 is mounted on the carriage 22, for example, so that the light emitting part and the light receiving part are located at approximately the same height as the ejection port surface 34.

The heating part 16 irradiates heat to the printing surface Pf of the print medium P on which printing has been performed, in order to heat the printing surface Pf and the ink ejected on the printing surface Pf and fix the ink to the printing surface Pf. The heating part 16 is covered with the cover 17, and the cover 17 has a function of efficiently reflecting the heat of the heating part 16 onto the print medium P and a function of protecting the heating part 16. As the heating part 16, various kinds of heaters such as a sheathed heater and a halogen heater can be used, for example. Not only such a noncontact type heat conduction heater, it is also possible that the heating part 16 is configured to apply heat with warm air. Note that the heating part 16 is configured to fix ink to the print medium P, and thus, depending on the type of ink used, the printing apparatus 10 may be configured without the heating part 16. Further, although illustration in the drawings is omitted, the printing apparatus 10 may be equipped with a cutter part that can cut the print medium P at a predetermined position.

The recovery part 18 is equipped with the suction part 26, which is installed at a position adjacent to one end of the platen 12 in the X direction, and the maintenance part 28, which is installed at a position adjacent to the other end of the platen 12 in the X direction. That is, the suction part 26 is located in the area S1 on the one end side of the print area Sp, in which printing is performed by the print head 24 to the print medium P that is supported by the platen 12. Further, the maintenance part 28 is located in the area S2 on the other end side of the print area Sp. Note that the detailed configuration of the maintenance part 28 is described hereafter.

The suction part 26 has a configuration for performing a suction process to maintain and recover good ink ejection performance from each ejection port by forcibly suctioning ink from multiple ejection ports constituting each ejection port array 302 in the print head 24. The suction part 26 is equipped with the cap 36 that covers a predetermined area including the ejection port arrays 302 on the ejection port surface 34 of the print head 24. Specifically, the cap 36 covers the K ink ejection port array, the C ink ejection port array, the M ink ejection port array, and the Y ink ejection port array. Note that the cap 36 may be configured independently for each ink color.

The cap 36 is connected to the pump 40 via the tube 38. With the cap 36 abutting on the ejection port surface 34 to cover the predetermined area including each ejection port array 302, a negative pressure is generated inside the cap 36 by the pump 40 connected to the cap 36, so that the negative pressure forcibly suctions the ink from each ejection port. The cap 36 is configured to be movable in the Z direction by the raising/lowering part 42. The cap 36 is raised by the raising/lowering part 42 to be made to abut on the ejection port surface 34 and cover the predetermined area, and is lowered by the raising/lowering part 42 to be made to separate from the ejection port surface 34 and release the predetermined area.

(Configuration of the Print Head)

Figure 3:
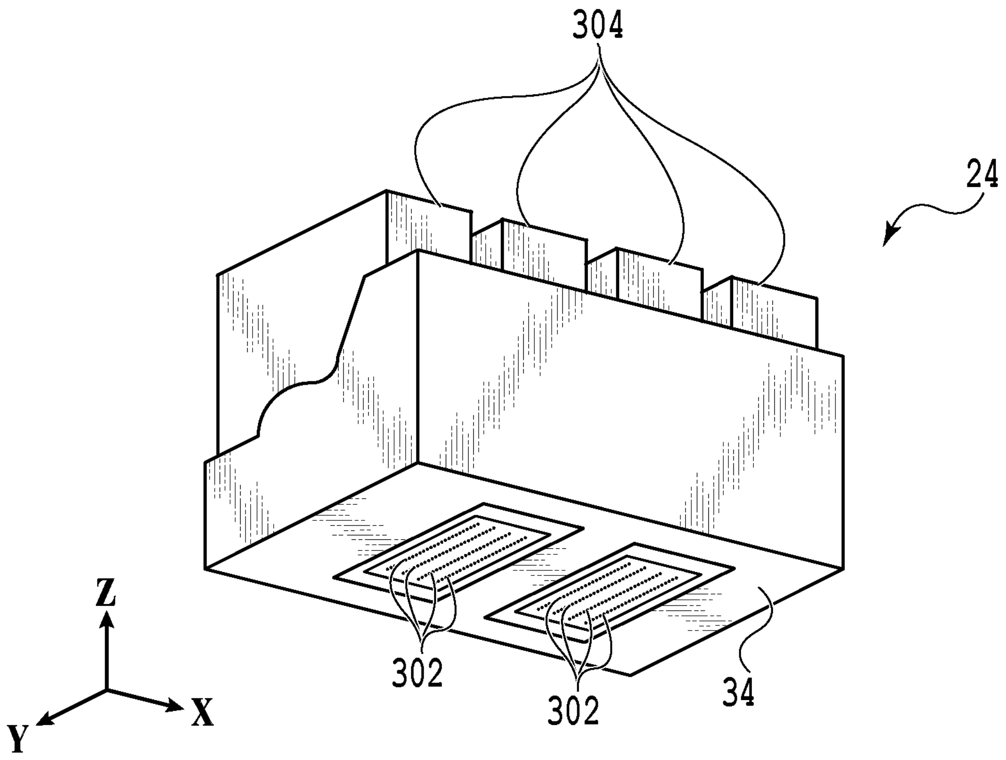
FIG. 3 is a perspective configuration diagram of a print head.

Next, an explanation is given of the configuration of the print head 24. FIG. 3 is a schematic configuration diagram of the print head 24. On the ejection port surface 34 of the print head 24, the ejection port arrays 302 formed of multiple ejection ports for ejecting the corresponding ink are formed for the respective ink colors. The ejection port arrays 302 extend in the Y direction, and the ejection port arrays 302 corresponding to the respective colors of ink are arranged side by side along the X direction.

In the present embodiment, the ejection port arrays 302 have 1280 ejection ports arranged along the Y direction at a density of 1200 dpi. The amount of ink droplet ejected at one time from each ejection port is approximately 4.5 pl. In an area of the ejection port surface 34 including the ejection port arrays 302, for example, in an area including at least a predetermined area to be covered by the cap 36, a water-repellent film which repels ink, i.e., which has water repellency, is formed to prevent ink droplets from adhering to each ejection port. This water-repellent film prevents ink droplets from adhering to the ejection ports, thereby maintaining stable ejection performance from each ejection port. The contact angle of the ink on the water-repellent film is, for example, 80 degrees or more and 100 degrees or less. The contact angle refers to an contact angle (dynamic receding contact angle) of an ink droplet on the water-repellent film. In the present embodiment, water repellency indicates that a water droplet (ink droplet) that has come into contact does not wet or spread on the contact portion. Whether the water repellency is high or low can be determined by measuring the contact angle (dynamic receding contact angle) of an ink droplet in contact with the surface of the member.

To each ejection port, ink is supplied via an ink flow path (not illustrated in the drawings) inside the print head 24 from the joint part 304, which is connected to an ink tank (not illustrated in the drawings) storing the corresponding ink via a supply tube (not illustrated in the drawings). The print head 24 is a thermal inkjet print head that ejects ink using thermal energy, and is equipped with multiple electrothermal converter for generating thermal energy. That is, the print head 24 generates thermal energy based on a pulse signal applied to an electrothermal converter, causes film boiling of the ink in an ink bubbling chamber (not illustrated in the drawings) with this thermal energy, and ejects ink from an ejection port using the foaming pressure of the film boiling. Note that the ink ejection method is not limited as such, and other publicly-known methods such as a method using a piezoelectric element may be used.

Although the configuration in which the carriage 22 is equipped with one print head 24 is explained as an example in the present embodiment, such a configuration in which the carriage 22 is equipped with multiple print heads 24 is also possible. Further, ink is supplied to the print head 24 via a supply tube from an ink tank mounted in the main body or on an external unit. Ink is supplied from the ink tank to the print head 24 using a pressurizing unit. Alternatively, ink may be supplied from the ink tank to the print head 24 by suctioning, which is performed by capping the ejection port surface 34 of the print head 24 with the cap 36 and applying negative pressure in the cap 36 with the pump 40.

(Maintenance Part)

Figure 4:
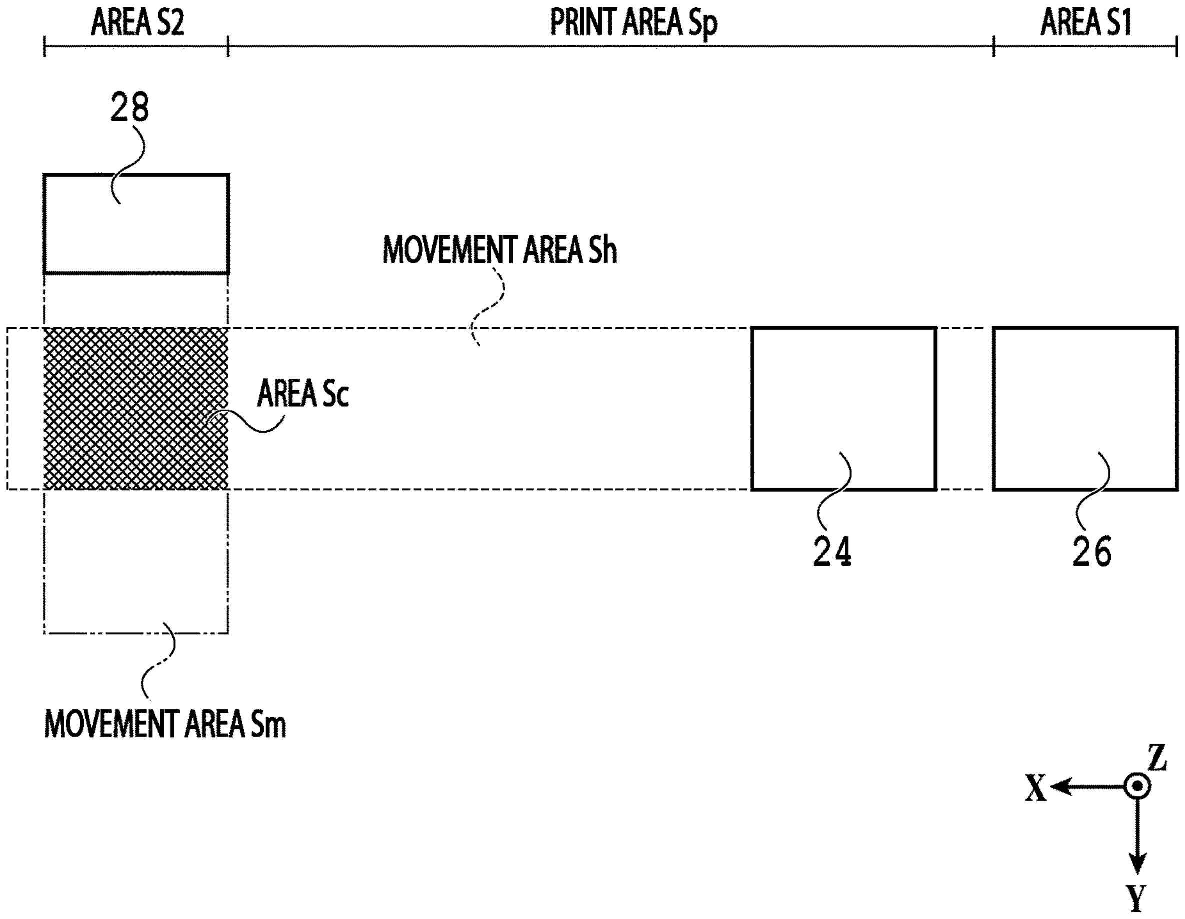
FIG. 4 is a diagram illustrating the movement areas of the print head and a maintenance part.
Figure 5A:
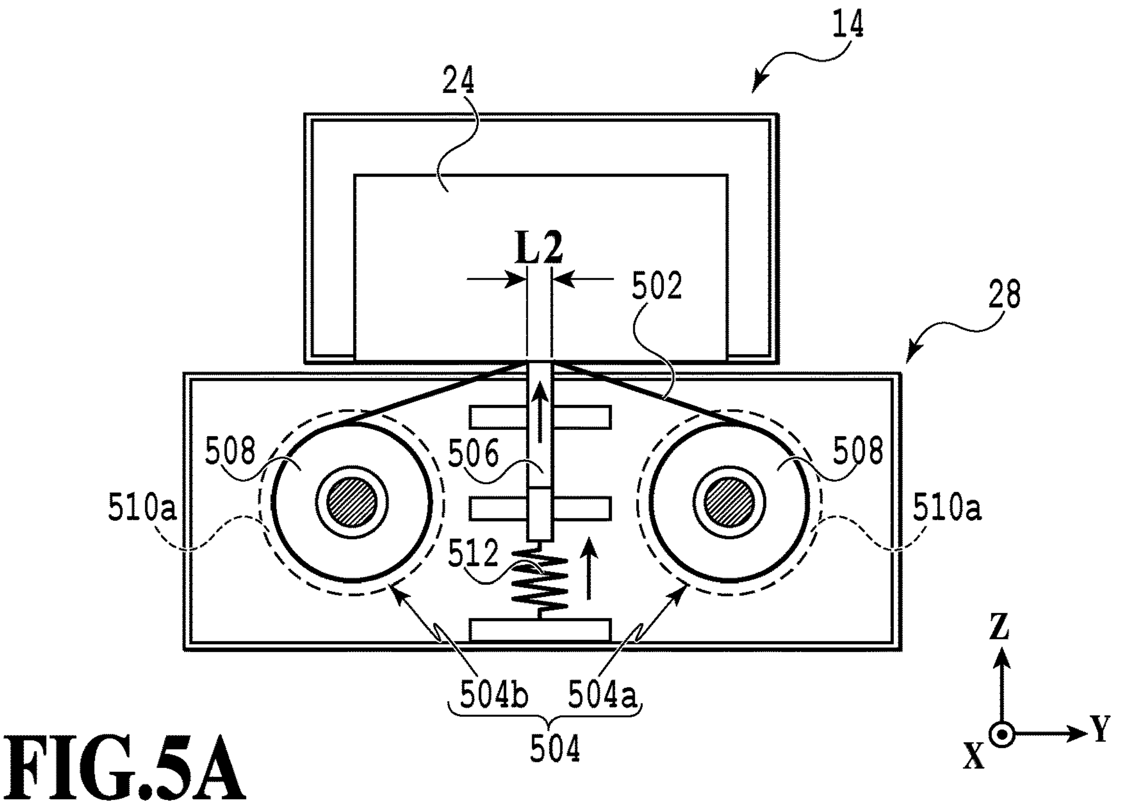
FIG. 5A and FIG. 5B are schematic configuration diagrams of the maintenance part.
Figure 5B:
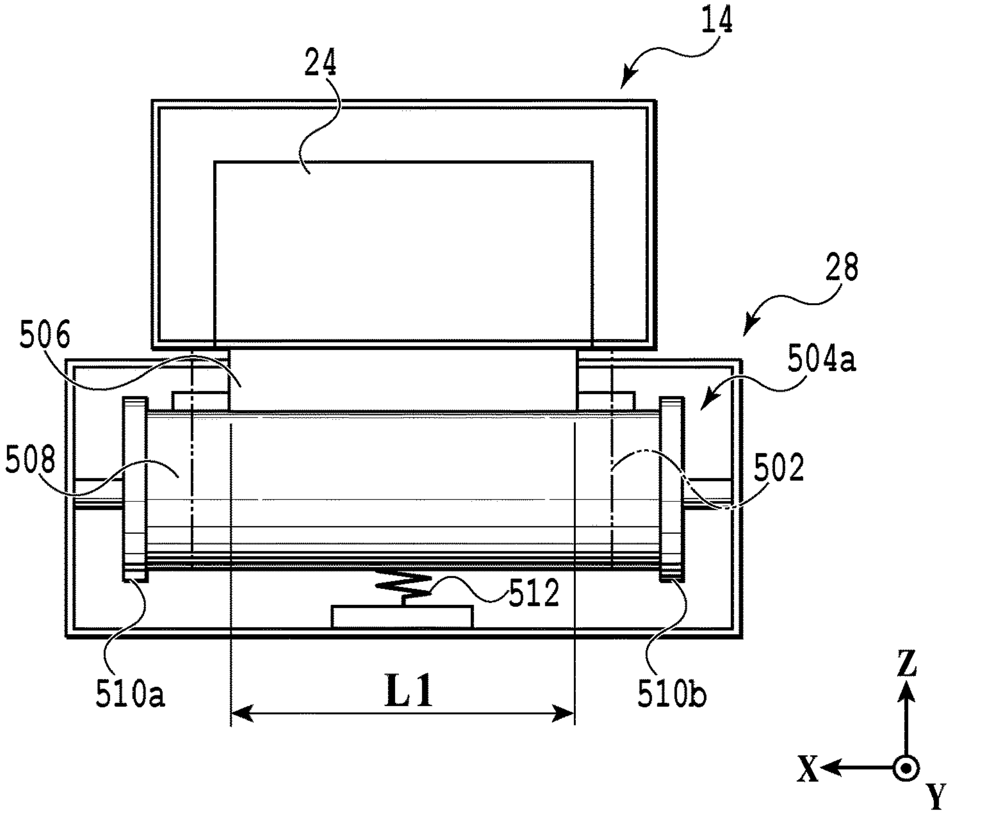

Next, an explanation is given of the maintenance part 28 in the recovery part 18. FIG. 4 is a diagram illustrating the movement area Sm of the maintenance part 28 and the movement area Sh of the print head 24. FIG. 5A and FIG. 5B are schematic configuration diagrams of the maintenance part 28. FIG. 5A is a side view diagram seen from the other side in the X direction, and FIG. 5B is a front view diagram. Note that, in FIG. 5A and FIG. 5B, in order to facilitate understanding, a side wall portion is cut away so that the internal structures can be seen, and some of the structures are indicated with broken lines.

The maintenance part 28 is installed in the area S2 on the other end side of the print area Sp so as to be movable in the Y direction. As illustrated in FIG. 4, the movement area Sm of the maintenance part 28 partially overlaps the movement area Sh of the print head 24, which moves in the X direction. The maintenance part 28 is capable of performing reciprocal movement between the first position, which is located on the other side in the Y direction with respect to the movement area Sh of the print head 24, and the second position, which is located on one side in the Y direction with respect to the movement area Sh.

At the time of not executing the wiping operation, the maintenance part 28 is located at the standby position, which is, for example, within the movement area Sm of the maintenance part 28 not overlapping the movement area Sh of the print head 24. Further, at the time of executing the wiping operation, the maintenance part 28 moves from the wiping start position toward the wiping end position in a state where the print head 24 is located at the wiping position within the area Sc where the movement area Sm and the movement area Sh overlap. Note that the wiping start position is a position where the maintenance part 28 starts wiping, and for example, is set on the first position side so as not to overlap the area Sc. The wiping end position is a position where the maintenance part 28 ends wiping, and for example, is set on the second position side so as not to overlap the area Sc.

The maintenance part 28 is equipped with the sheet-shaped wiping member 502 that receives ink during wiping and abuts on the ejection port surface 34 to wipe off ink and the like that has adhered to the ejection port surface 34 (see FIG. 5A). Further, the maintenance part 28 is equipped with the winding part 504, which winds up the wiping member 502, and the pressing member 506, which presses the wiping member 502 to make the wiping member 502 abut on the ejection port surface 34 at a predetermined pressure.

As the wiping member 502, a porous material is used, for example. A porous material absorbs ink from ejection ports during wiping more easily than an elastic material. Furthermore, the wiping member 502 may be impregnated in advance with an impregnating liquid containing, for example, a solvent with low volatility such as polyethylene glycol as a main component. For the wiping member 502, a non-woven fabric is used, for example. More specifically, it is preferable to use a sheet web or a pad-like non-woven fabric that is made with fibers bonded or entangled by melt-adhesion or mechanical or chemical action. The wiping member 502 can instantaneously absorb adhering liquid such as ink with capillary pressure created by fine pores of the non-woven fabric. As the non-woven fabric, a non-woven fabric made of short polyester fibers can be used, for example. Further, the wiping member 502 may be a sheet-like knitted fabric or woven fabric made of long fibers, and may be made of a mixture of polyester and nylon, cotton, or the like.

The winding part 504 is equipped with the rotary member 504*a*, around which the wiping member 502 that has been unused is wound, and the rotary member 504*b*, which winds up the wiping member 502 that has been used. The rotary member 504*b* is arranged on one side of Y direction with respect to the rotary member 504*a*. The tip of the wiping member 502 is attached to the rotary member 504*b*, and the rotary member 504*b* winds up the wiping member 502 by rotating under the control of the control part 700.

The driving of the rotary member 504*b* is controlled by the driving of a conveyance motor that drives the conveyance roller 23, via a gear, for example. Accordingly, the wiping member 502 located between the rotary member 504*a* and the rotary member 504*b* is conveyed in the opposite direction of the conveyance direction of the print medium P. Note that the conveyance amount of the wiping member 502 is not limited to being controlled by the driving amount of the conveyance motor. For example, it is also possible to install a configuration that can measure the conveyance amount of the wiping member 502, so that the conveyance amount is controlled based on the measurement results of the configuration. The rotary members 504*a* and 504*b* are equipped with the pairs of disk members 510*a* and 510*b* installed at both ends of the X direction of the core parts 508 around which the wiping member 502 is wound. The diameter of each of the disk members 510*a* and 510*b* is greater than the diameter of the core parts 508.

In the maintenance part 28, the wiping member 502 that is located across the rotary member 504*a* and the rotary member 504*b* is exposed in a view from above. The size of the exposed wiping member 502 is, for example, a size capable of abutting on a predetermined area including each ejection port array 302 of the ejection port surface 34 of the print head 24 located at the wiping position while the maintenance part 28 moves in the movement area Sm in a state being pressed by the pressing member 506. Moreover, the size is such that printing can be performed on the wiping member 502 by the print head 24 at the pattern printing position (described hereinafter).

Between the rotary member 504*a* and the rotary member 504*b*, the pressing member 506 presses the wiping member 502, which is located across the rotary member 504*a* and the rotary member 504*b*, toward the other side in the Z direction, i.e., toward the upper side, by the biasing force of the biasing member 512. The length L1 of the pressing member 506 in the X direction corresponds to the predetermined area of the ejection port surface 34 of the print head 24 located at the wiping position. Note that the length in the X direction across which the wiping member 502 is pressed by the pressing member 506 may be longer than the length corresponding to the predetermined area. For example, a length that can cover the entire ejection port surface 34 of the print head 24 is possible. In this case, it is possible to wipe the entire ejection port surface 34 by the correspondence of the length of the wiping member 502 in the X direction, and thus, if the predetermined area is capped with the cap 36, a gap is less likely to be formed between the cap 36 and the ejection port surface 34. For example, the length L2 of the pressing member 506 in the Y direction may be about 5 mm. This is a length that allows the wiping member 502 pressed by the pressing member 506 to abut on approximately 240 ejection ports at once in the ejection port arrays 302.

Further, the maintenance part 28 is equipped with a lowering part (not illustrated in the drawings) that lowers the pressing member 506. This lowering part lowers the pressing member 506 against the biasing force of the biasing member 512 under the control of the control part 700. Accordingly, the maintenance part 28 can be moved within the movement area Sm without making the wiping member 502 abut on the ejection port surface 34. Note that, although the maintenance part 28 is moved relative to the print head 24 located at the wiping position to wipe the ejection port surface 34 in the present embodiment, there is not a limitation as such. It is also possible that the maintenance part 28 is fixed and the ejection port surface 34 is wiped by moving the print head 24, or that the ejection port surface 34 is wiped by moving both the print head 24 and the maintenance part 28. That is, any configuration is possible as long as the printing apparatus 10 wipes the ejection port surface 34 by relative movement of the print head 24 and the maintenance part 28.

<Configuration for Applying the Wiping Liquid>

Figure 6A:
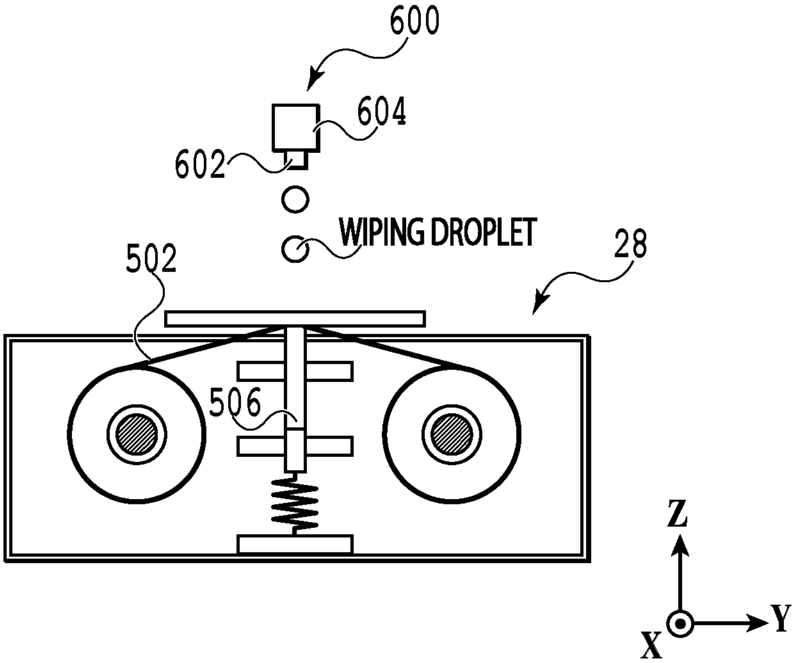
FIG. 6A and FIG. 6B are schematic configuration diagrams of a liquid application part.
Figure 6B:
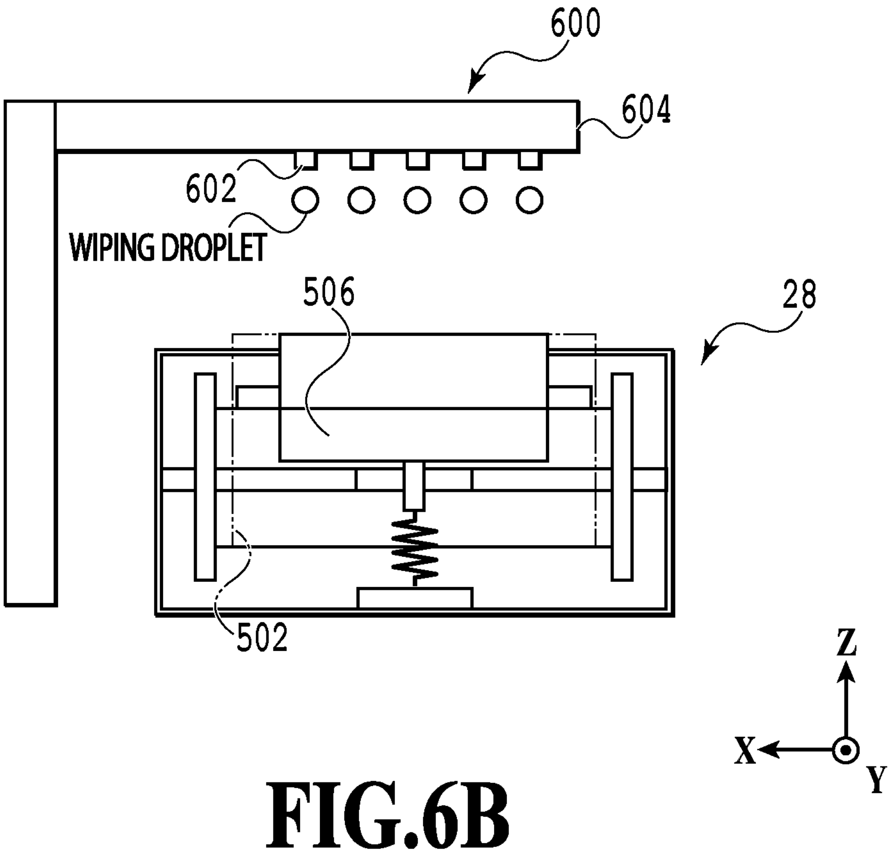

Next, FIG. 6A and FIG. 6B for explaining a liquid application part that applies a wiping liquid are schematic configuration diagrams of the liquid application part. Further, FIG. 6A is a side view diagram, and FIG. 6B is a front view diagram. The maintenance part 28 is equipped with the liquid application part 600 that applies a wiping liquid to the wiping member 502 in order to perform wiping without reducing the ink ejection performance of the print head 24. The liquid application part 600 is configured so as to be capable of applying a wiping liquid to the area of the wiping member 502 to be pressed by the pressing member 506 at a predetermined position other than the area Sc of the movement area Sm of the maintenance part 28. The wiping liquid has a function of re-dispersing the ink that has adhered to or solidified on the ejection port surface 34. Accordingly, if the ejection port surface 34 is wiped with the wiping member 502 to which the wiping liquid is applied, the ink that has adhered to, thickened, or solidified on the ejection port surface 34 is given fluidity, so that the ink is removed by the wiping member 502 more easily.

The liquid application part 600 is equipped with the liquid ejection part 602 capable of ejecting the wiping liquid to the area of the wiping member 502 to be pressed by the pressing member 506 in the maintenance part 28 located at the liquid application position. In the present embodiment, the multiple liquid ejection parts 602 are arranged side by side along the X direction above the wiping member 502 of the maintenance part 28 located at the liquid application position. The wiping liquid is fed to the liquid ejection parts 602 from a wiping liquid tank that stores the wiping liquid via the tube 604 using a pressure-applying mechanism. The liquid ejection parts 602 eject the wiping liquid as droplets.

In the liquid application part 600, an electromagnetic valve (not illustrated in the drawings) is installed on the upstream side of the liquid ejection parts 602 in the wiping liquid feeding direction, so that the amount of wiping liquid droplets to be ejected can be adjusted. In the present embodiment, a wiping liquid droplet of approximately 0.05 g is ejected from one liquid ejection part 602. Accordingly, if one wiping liquid droplet lands on the wiping member 502, a 1 cm square area becomes wet with the wiping liquid. In the present embodiment, the liquid ejection parts 602 are installed so that the entire area of the wiping member 502 to be pressed by the pressing member 506 (that is, the area located directly above the pressing member 506) becomes wet with the wiping liquid.

Note that the liquid application parts 600 are not limited to the configuration described above, and may apply the wiping liquid by a spray system, or may apply the wiping liquid by transfer using an application roller. Alternatively, another possible configuration is that the wiping liquid is ejected from the contact surface of the pressing member 506 against the wiping member 502, so that the wiping liquid is applied from the back side of the wiping member 502.

<Configuration of the Control System of the Printing Apparatus>

Figure 7:
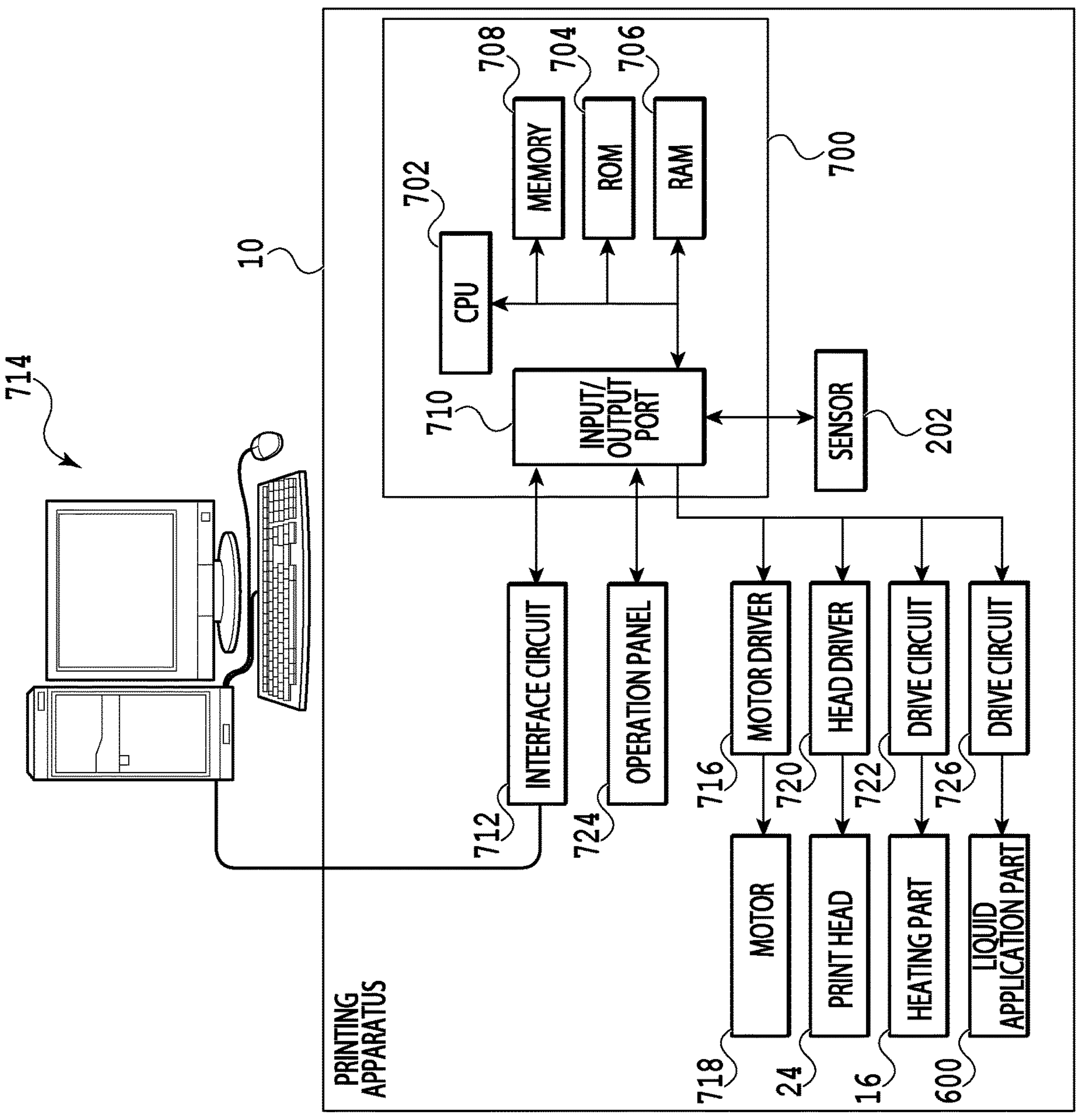
FIG. 7 is a block diagram illustrating the configuration of a control system of the printing apparatus.

Next, an explanation is given of the configuration of the control system of the printing apparatus 10. FIG. 7 is a block diagram illustrating the configuration of the control system of the printing apparatus 10.

The control part 700 that controls the entire printing apparatus 10 is equipped with the central processing unit (CPU) 702, the ROM 704, the RAM 706, and the memory 708. The CPU 702 controls the operation of each constituent member in the printing apparatus 10, processes input image data, or the like, based on various programs. The ROM 704 functions as a memory for performing various kinds of control executed by the CPU 702 and for storing processing programs for image data. The RAM 706 is a memory that temporarily stores various kinds of data used to control the printing apparatus 10, and serves as a work area used by the CPU 702 for executing various processes. The memory 708 stores data such as the hereafter-described mask pattern and the hereafter-described predetermined pattern. Further, the control part 700 is equipped with the input/output port 710, and is connected to various drivers, drive circuits, etc., via this input/output port 710.

The control part 700 is connected to the interface circuit 712 via the input/output port 710, and is connected to the host apparatus 714 via this interface circuit 712. Further, the control part 700 is connected via the input/output port 710 to the operation panel 724 that can be operated by the user. The user inputs image data or the like to the printing apparatus 10 via the host apparatus 714, and also inputs various kinds of information to the printing apparatus 10 via the host apparatus 714 and the operation panel 724. Further, the control part 700 is connected to the motor driver 716 via the input/output port 710, so as to control the driving of the motor 718 via this motor driver 716. Note that, in FIG. 7, various motors in the printing apparatus 10, such as a motor for moving the carriage 22, a motor for conveying the print medium P, a motor for moving the maintenance part 28, and a motor for driving the winding part 504, are collectively illustrated as the motor 718.

The control part 700 is connected to the head driver 720 via the input/output port 710, so as to control the print head 24 via the head driver 720 to eject ink. Further, the control part 700 is connected to the drive circuit 722 via the input/output port 710, so as to control the driving of the heating part 16 via the drive circuit 722. Furthermore, the control part 700 is connected to the sensor 202 via the input/output port 710, so as to control the driving of the sensor 202 and receive detection results from the sensor 202. Moreover, the control part 700 is connected to the drive circuit 726 via the input/output port 710, so as to control the driving of the liquid application part 600 via the drive circuit 722.

In the control part 700, the CPU 702 converts image data that is input from the host apparatus 714 into print data, and stores the print data in the RAM 706. Specifically, if the CPU 702 obtains image data represented by the information of RGB each of which has 8-bit 256 values (0 to 255), this image data is converted into multi-valued data which is represented by multiple types of ink used in printing (which are K, C, M, and Y in the present embodiment). By this color conversion process, multi-valued data represented by the information of 8-bit 256 values (0 to 255), which defines the tone of each K, C, M, or Y ink in each pixel group consisting of multiple pixels, is generated.

Next, the multi-valued data represented as K, C, M, and Y is quantized, so as to generate quantization data (binary data) represented by 1-bit binary information (0, 1) which defines ejection or non-ejection of each K, C, M, or Y ink for each pixel. As this quantization process, various publicly-known quantization methods such as an error diffusion method, a dither method, and an index method can be used. Thereafter, a distribution process is performed for distributing the quantization data for multiple times of scanning to be performed by the print head 24 on a unit area. This distribution process generates the print data represented by 1-bit binary information (0, 1) that defines ejection or non-ejection of each K, C, M, or Y ink for each pixel in each of the multiple times of scanning performed on a unit area of a print medium. This distribution process corresponds to multiple times of scanning and is executed using a mask pattern that defines allowance or no allowance of ink ejection for each pixel. Note that generation of such print data is not limited to that executed by the control part 700. That is, the generation may be executed by the host apparatus 714, and it is also possible that a part of the process is performed by the host apparatus 714 and the remaining process is executed by the control part 700.

<Ink Composition>

The ink used in the present embodiment is preferably an aqueous ink for inkjet containing a coloring material. Hereafter, a detailed explanation is given of each component used in the ink. Note that "parts" and "%" described regarding component amounts are mass scales unless otherwise specified.

<Coloring Material>

Pigments and dyes can be used as a coloring material contained in the ink. The content (mass %) of a coloring material in the ink is preferably 0.5 mass % or more and 15.0 mass % or less, and more preferably 1.0 mass % or more and 10.0 mass % or less, on the basis of the total mass of the ink. Specific examples of pigments include inorganic pigments, such as carbon black and titanium oxide, and organic pigments, such as azo, phthalocyanine, quinacridone, isoindolinone, imidazolone, diketopyrrolopyrrole, and dioxazine.

As a pigment dispersion method, a resin-dispersed pigment using a resin as a dispersant, a self-dispersible pigment in which a hydrophilic group is bonded to the particle surfaces of a pigment, etc., can be used. Further, a resin-bonded pigment in which an organic group containing a resin is chemically bonded to the particle surfaces of a pigment, a microcapsule pigment in which the particle surfaces of a pigment are coated with a resin or the like, etc., can be used. In the present embodiment, it is preferable to use a resin-dispersed pigment in which a resin as a dispersant is physically adsorbed onto the particle surfaces of a pigment, rather than a resin-bonded pigment or a microcapsule pigment.

As a resin dispersant for dispersing a pigment in an aqueous medium, it is preferable to use one that can disperse a pigment in an aqueous medium by an action of an anionic group. As a resin dispersant, resins such as those described below, especially water-soluble resins, can be used. The content (mass %) of a pigment in the ink is preferably 0.3 times or more and 10.0 times or less than the content of a resin dispersant in a mass ratio.

As a self-dispersible pigment, one in which an anionic group such as a carboxylic acid group, a sulfonic acid group, or a phosphonic acid group is bonded to the particle surfaces of a pigment directly or via another atomic group (—R—) may be used. The anionic group may be either an acid type or a salt type, and, in a case of a salt type, it may be in either partially dissociated or completely dissociated state. In a case when the anionic group is a salt type, examples of the cation serving as a counter ion include an alkali metal cation, ammonium, organic ammonium, etc. Specific examples of another atomic group (—R—) include: a linear or branched alkylene group with 1 to 12 carbon atoms, an arylene group such as a phenylene group and a naphthylene group, a carbonyl group, an imino group, an amide group, a sulfonyl group, an ester group, an ether group, etc. Further, a combination of these groups is also possible.

As a dye, it is preferable to use one with an anionic group. Specific examples of dyes include dyes such as azo, triphenylmethane, (aza)phthalocyanine, xanthene, anthrapyridone, etc. The coloring material contained in the ink used in the present embodiment is preferably a pigment, and more preferably a resin-dispersed pigment.

<Resin>

The ink can contain a resin. The content (mass %) of the resin in the ink is preferably 0.1 mass % or more and 20.0 mass % or less, and more preferably 0.5 mass % or more and 15.0 mass % or less, on the basis of the total mass of the ink.

The resin can be added to the ink in order to (i) stabilize the dispersion state of the pigment, that is, as a resin dispersant or its aid. Further, the resin can be added to the ink in order to (ii) improve various characteristics of printed images. The form of the resin may be a block copolymer, a random copolymer, a graft copolymer, and a combination of these. Further, the resin may be a water-soluble resin that can be dissolved in an aqueous medium, or may be resin particles dispersed in an aqueous medium.

=Resin Composition=

Examples of the resin include acrylic resin, urethane resin, olefin resin, etc. Among these, acrylic resin and urethane resin are preferred, and acrylic resin composed of units derived from (meth)acrylic acid and (meth)acrylate are more preferred.

The acrylic resin preferably has a hydrophilic unit and a hydrophobic unit as constituent units. Among these, a resin containing a hydrophilic unit derived from (meth)acrylic acid and a hydrophobic unit derived from at least one of a monomer with an aromatic ring and a (meth)acrylic acid ester monomer is preferred. Particularly, a resin containing a hydrophilic unit derived from (meth)acrylic acid and a hydrophobic unit derived from at least one of styrene and α-methylstyrene monomers is preferred. Since these resins tend to interact with pigments, they can be suitably used as resin dispersants for dispersing pigments.

A hydrophilic unit is a unit with a hydrophilic group such as an anionic group. A hydrophilic unit can be formed, for example, by polymerizing hydrophilic monomers with hydrophilic groups. Specific examples of a hydrophilic monomer with a hydrophilic group include an acidic monomer with a carboxylic acid group such as (meth)acrylic acid, itaconic acid, maleic acid, and fumaric acid, an anionic monomer such as anhydrides and salts of these acidic monomers, etc. Examples of cations constituting the salt of an acidic monomer include ions such as lithium, sodium, potassium, ammonium, and organic ammonium. A hydrophobic unit is a unit without a hydrophilic group such as an anionic group. A hydrophobic unit can be formed, for example, by polymerizing hydrophobic monomers without hydrophilic groups such as anionic groups. Specific examples of a hydrophobic monomer include: a monomer with an aromatic ring such as styrene, α-methylstyrene, and benzyl (meth)acrylate; a (meth)acrylic acid ester monomer such as methyl (meth)acrylate, butyl (meth)acrylate, and 2-ethylhexyl (meth)acrylate, etc.

Urethane resins can be obtained, for example, by reacting polyisocyanates and polyols. Alternatively, it may be further reacted with a chain extender. Examples of an olefin resin include polyethylene, polypropylene, etc.

=Properties of Resins=

In the present specification, "the resin is water-soluble" indicates that, in a case when the resin is neutralized with an alkali equivalent to its acid value, the resin is present in the aqueous medium in a state where particles with a particle size that can be measured by a dynamic light scattering method are not formed. Whether or not a resin is water-soluble can be determined according to the method described below. First, a liquid (resin solid content: 10 mass %) containing a resin neutralized with an alkali (sodium hydroxide, potassium hydroxide, etc.) equivalent to its acid value is prepared. Next, the prepared liquid is diluted in a 1:10 ratio (on a volume basis) with pure water to prepare a specimen solution. Further, in a case when particles with the particle size are not measured as a result of measuring the particle size of the resin in the specimen solution by a dynamic light scattering method, it can be determined that the resin is water-soluble. The measurement conditions therein can be, for example, SetZero: 30 seconds, the number of times of measurements: 3 times, and the measurement time period: 180 seconds. Further, as a particle size distribution measuring apparatus, a particle size analyzer using a dynamic light scattering method (for example, product name "UPA-EX150", manufactured by Nikkiso Co., Ltd.) or the like can be used. Needless to say, the particle size distribution measuring apparatus and measurement conditions used are not limited to those described above.

The acid value of the water-soluble resin is preferably 100 mgKOH/g or more and 250 mgKOH/g or less. The weight average molecular weight of the water-soluble resin is preferably 3,000 or more and 15,000 or less.

The acid value of the resin constituting the resin particles is preferably 5 mgKOH/g or more and 100 mgKOH/g or less. The weight average molecular weight of the resin constituting the resin particles is preferably 1,000 or more and 2,000,000 or less. The volume average particle diameter of the resin particles measured by a dynamic light scattering method is preferably 50 nm or more and 500 nm or less. The resin particles do not need to contain a coloring material.

<Aqueous Medium>

The ink used in the present embodiment is an aqueous ink containing at least water as an aqueous medium. The ink can contain an aqueous medium that is water or a mixed medium of water and a water-soluble organic solvent. As the water, it is preferable to use deionized water or ion-exchanged water. The content (mass %) of the water in the aqueous ink is preferably 50.0 mass % or more and 95.0 mass % or less, on the basis of the total mass of the ink. Further, the content (mass %) of the water-soluble organic solvent in the aqueous ink is preferably 3.0 mass % or more and 50.0 mass % or less, on the basis of the total mass of the ink. As the water-soluble organic solvent, any solvent that can be used in inkjet inks, such as alcohols, (poly)alkylene glycols, glycol ethers, nitrogen-containing compounds, and sulfur-containing compounds, can be used.

Other Components

In addition to the above-mentioned components, the ink used in the present embodiment may include various additives such as a defoaming agent, a surfactant, a pH adjuster, a viscosity adjuster, a rust preventive, a preservative, an antifungal agent, an antioxidant, and a reducing inhibitor, as needed. However, it is preferable that the ink does not contain a reactant used in the reaction liquids as described above.

(Physical Properties of the Ink)

The ink used in the present embodiment is an aqueous ink applicable to an inkjet method. Therefore, from the viewpoint of reliability, it is preferable to appropriately control the physical property values. Specifically, the surface tension of the ink at 25° C. is preferably 20 mN/m or more and 60 mN/m or less. Further, the viscosity of the ink at 25° C. is preferably 1.0 mPa's or more and 10.0 mPa's or less. The pH of the ink at 25° C. is preferably 7.0 or more and 9.5 or less, and more preferably, 8.0 or more and 9.5 or less.

(Wiping Process)

Figure 8:
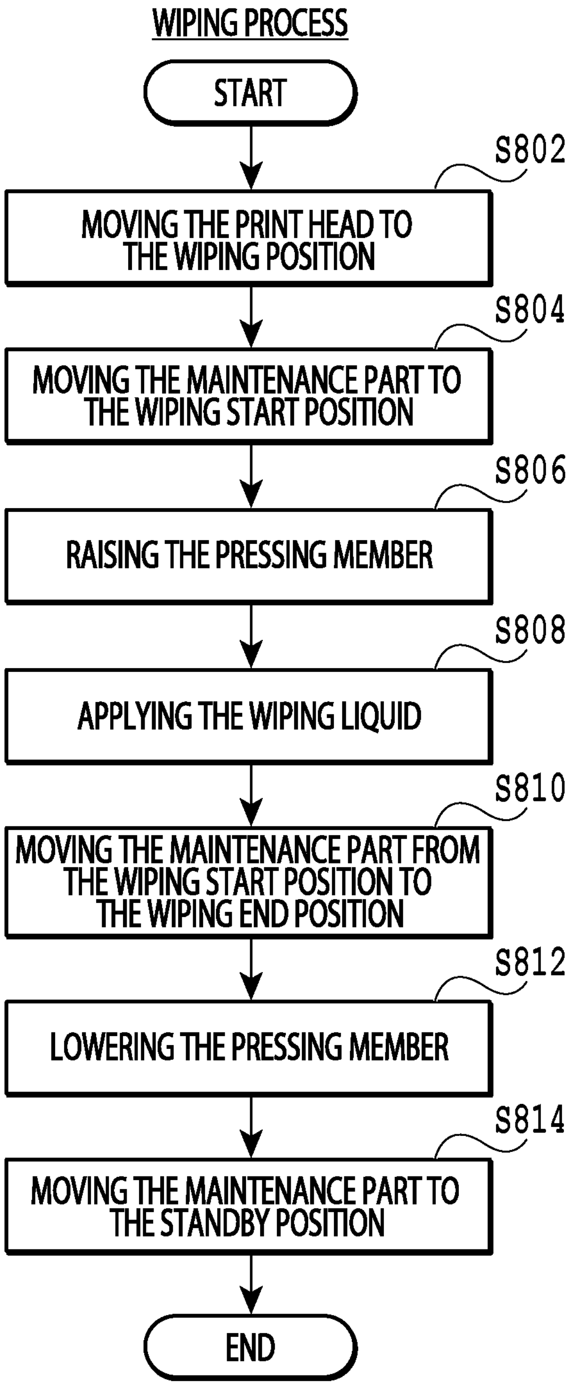
FIG. 8 is a flowchart of a wiping process.
Figure 9A:
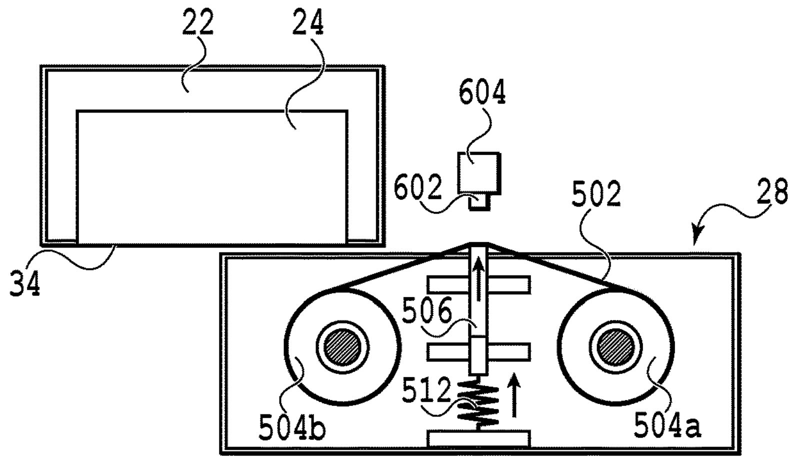
FIG. 9A to FIG. 9C are diagrams for explaining a state of the maintenance part in each process of the wiping process.
Figure 9B:
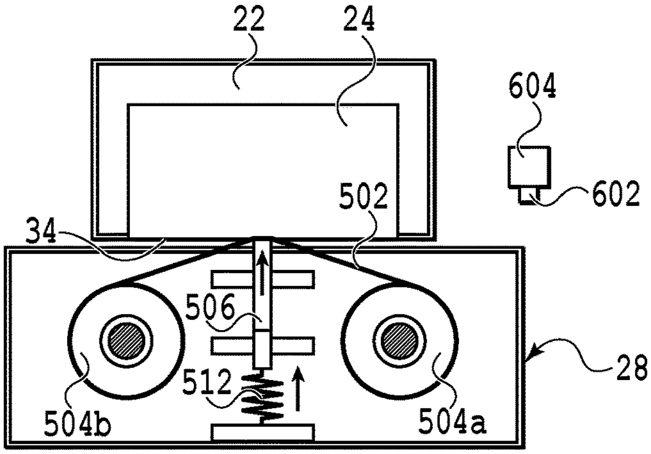
Figure 9C:
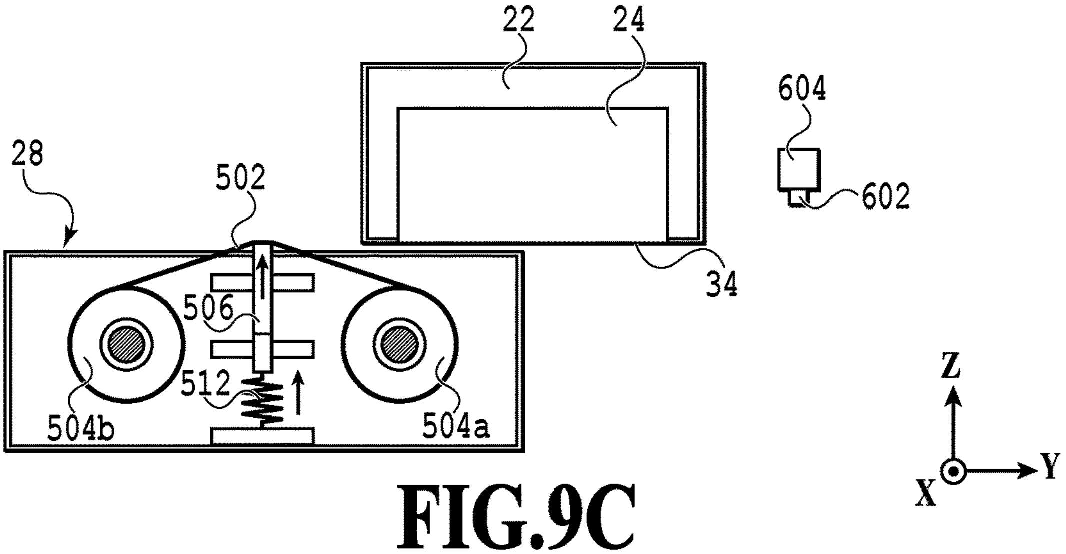

With the above configurations, the printing apparatus 10 performs a wiping process for executing a wiping operation performed by the maintenance part 28 to the ejection port surface 34 of the print head 24, for example, at a timing such as after a predetermined number of printing operations have ended. FIG. 8 is a flowchart illustrating details of processing of the wiping process. FIG. 9A to FIG. 9C are diagrams for explaining a wiping operation executed in the wiping process. The series of the processes illustrated in the flowchart of FIG. 8 is performed by the CPU 702 loading a program code stored in the ROM 704 into the RAM 706 and executing it. Alternatively, a part or all of the functions in the steps of the flowchart may be executed by hardware such as an ASIC or an electronic circuit. Note that the sign "S" in the explanation of each process indicates that it is a step in the flowchart (the same applies hereafter in the present specification).

If the wiping process is started, first, in S802, the CPU 702 moves the print head 24 to the wiping position, which is set within the area Sc. Next, in S804, the CPU 702 moves the maintenance part 28 to the wiping start position. The wiping start position is a position where the wiping member 502 does not abut on the ejection port surface 34 of the print head 24 at the time the wiping member 502 is pressed by the pressing member 506, and is a position on one side or the other side in the Y direction relative to the print head located at the wiping position. Note that, in the present embodiment, in order to facilitate understanding, it is assumed that the wiping start position matches the liquid application position. That is, in the present embodiment, the wiping liquid is applied from the liquid application part 600 to the portion to be pressed by the pressing member 506, which is a portion of the wiping member 502 of the maintenance part 28 located at the wiping start position.

After that, in S806, the CPU 702 raises the pressing member 506 to press the wiping member 502 (see FIG. 9A). Then, the processing proceeds to S808, and the CPU 702 causes the liquid application part 600 to apply the wiping liquid to the area of the wiping member 502 pressed by the pressing member 506. Note that the processing may immediately proceed to S810 after the application of the wiping liquid, or the processing may proceed to S810 after a certain period of time has passed after the application of the wiping liquid. By allowing a certain period of time to pass after the application of the wiping liquid, the wiping liquid reliably penetrates the portion (area) of the wiping member 502 to be pressed by the pressing member 506, and the effect of applying the wiping liquid can be reliably obtained.

Next, in S810, and the CPU 702 moves the maintenance part 28 from the wiping start position to the wiping end position while maintaining the state in which the wiping member 502 is pressed by the pressing member 506. As the maintenance part 28 moves from the wiping start position toward the wiping end position, the portion of the wiping member 502 pressed by the pressing member 506 abuts on the ejection port surface 34, so that the ejection port surface 34 is wiped (see FIG. 9B). Accordingly, deposits such as the ink that has adhered to the ejection port surface 34 is removed by the wiping member 502. The wiping end position is a position on the other side of the wiping start position with the area Sc of the movement area Sm located therebetween, and a position where the wiping member 502 does not abut on the ejection port surface 34 in the state where the wiping member 502 is pressed by the pressing member 506 (see FIG. 9C).

After the maintenance part 28 is moved to the wiping end position in S810, the processing proceeds to S812, and the CPU 702 lowers the pressing member 506 at the wiping end position. After that, the processing proceeds to S814, and the CPU 702 moves the maintenance part 28 to the standby position while the pressing member 506 is not pressing the wiping member 502, and ends this wiping process.

(Determination Process)

As described above, in the printing apparatus 10, wiping is performed with the wiping liquid applied to the wiping member. Here, the wiping liquid re-disperses the ink that has adhered to or solidified on the ejection port surface 34 and the ink that has adhered to the wiping member 502, so as to provide effects of making it easier for the ink to permeate the wiping member 502 side, reducing friction between the ejection port surface 34 and the wiping member 502, etc. Therefore, in a case when the wiping liquid is not applied or the wiping liquid is not applied in a sufficient amount, the above-mentioned effects cannot be obtained or the effects are reduced, which may deteriorate the ejection performance of the print head 24.

As a technology for detecting the application of a liquid to the wiping member, for example, the technology disclosed in Japanese Patent Laid-Open No. 2013-169761 is known. In the technology disclosed in Japanese Patent Laid-Open No. 2013-169761, the configuration for applying a liquid, the sensor for detecting the applied liquid, and the position for wiping the ejection port surface are arranged in this order from the upstream side to the downstream side of the conveyance direction of the wiping member. However, in the technology disclosed in Japanese Patent Laid-Open No. 2013-169761, the optical sensor simply detects the surface of the wiping member to which a colorless (almost colorless) and transparent wiping liquid has been applied. Therefore, in a case when the ejection amount of the wiping liquid varies or the wiping member is not appropriately installed, there is a possibility that accurate detection cannot be performed.

Therefore, in the present embodiment, a pattern is printed on the wiping member and a wiping liquid is applied to the wiping member, and a change in ink concentration (concentration distribution) within the area where the pattern is formed is detected. Furthermore, based on this detection result, a determination process is executed to determine the state of application of the wiping liquid to the wiping member, more specifically, to determine whether or not the wiping liquid is appropriately applied to the wiping member. Determining whether or not the wiping liquid is appropriately applied to the wiping member is, in other words, determining whether or not a predetermined amount or more of the wiping liquid is applied to the wiping member. Hereafter, a detailed explanation is given of the determination process.

Figure 10:
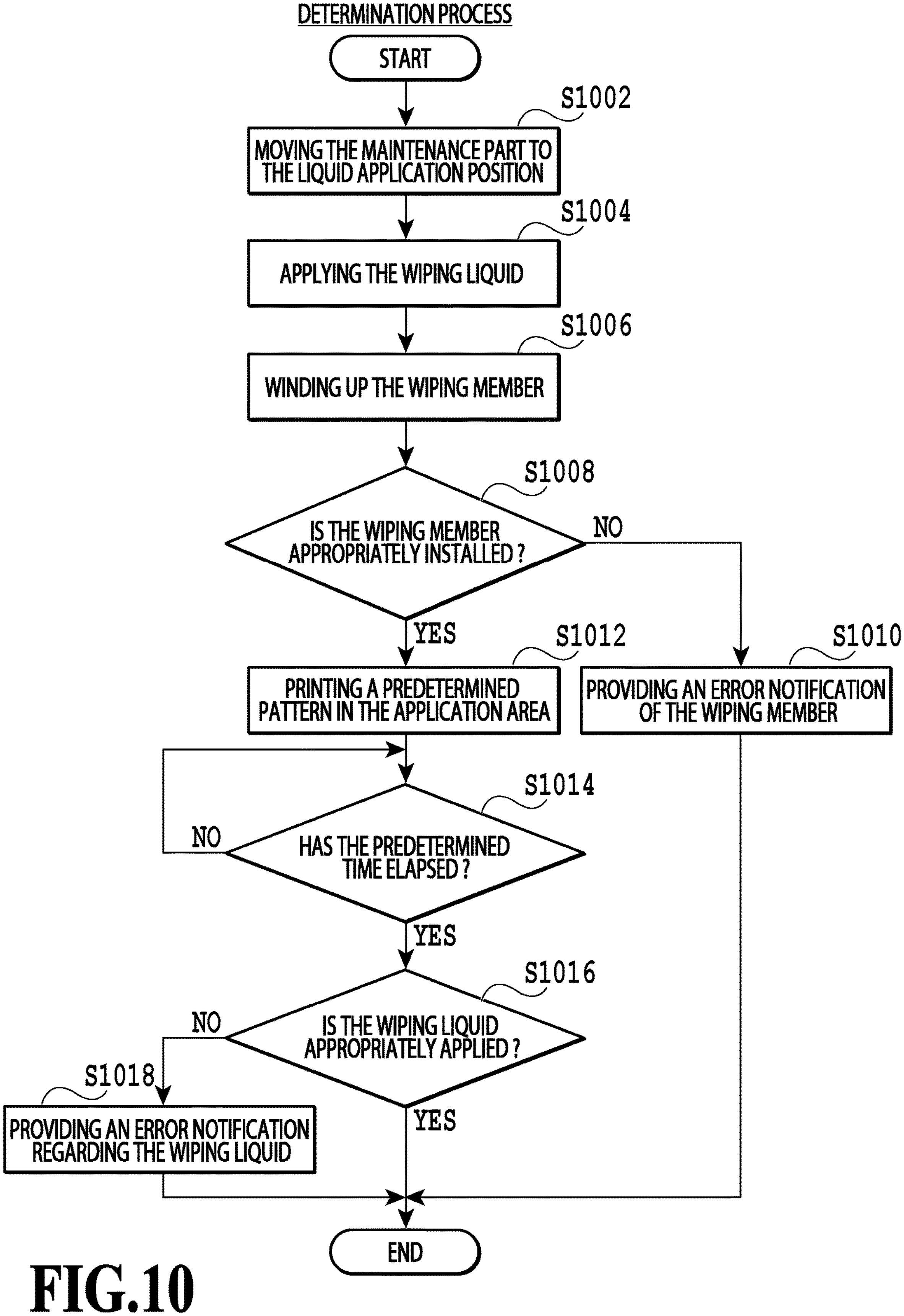
FIG. 10 is a flowchart of a determination process.

In the printing apparatus 10, for example, at a predetermined timing such as after executing the wiping operation with the maintenance part 28 a predetermined number of times, a determination process is executed to determine whether or not the wiping liquid is appropriately applied. FIG. 10 is a flowchart illustrating details of processing of the determination process. FIG. 11A to FIG. 11D are diagrams illustrating the positions of the print head and the maintenance part in each process of the determination process. Note that, in FIG. 11A to FIG. 11D, a case when the sensor 202 is installed on the other side of the carriage 22 in the X direction is illustrated. The series of the processes illustrated in the flowchart of FIG. 10 is performed by the CPU 702 loading a program code stored in the ROM 704 into the RAM 706 and executing it. Alternatively, a part or all of the functions in the steps of the flowchart may be executed by hardware such as an ASIC or an electronic circuit.

Figure 11A:
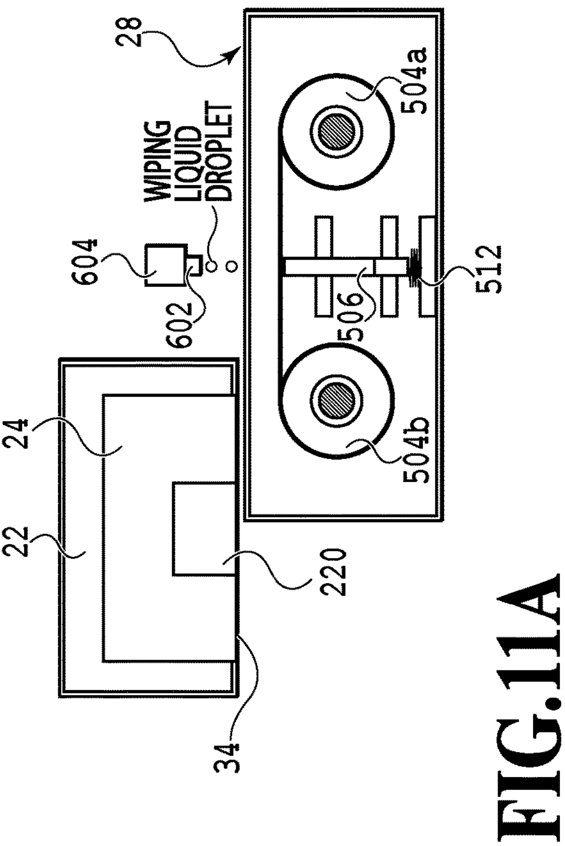
FIG. 11A to FIG. 11D are diagrams for explaining a state of each configuration in each process of the determination process.

If the determination process is started, first, in S1002, the CPU 702 moves the maintenance part 28 to the liquid application position, and, in S1004, the CPU 702 applies the wiping liquid to the wiping member 502 (see FIG. 11A). The application amount of the wiping liquid to the wiping member 502 and the application area of the wiping liquid are set in advance. Note that, in S1004, it is also possible that, in the state where the wiping member 502 is pressed by the pressing member 506, the wiping liquid is applied to the pressed area. In a case of being pressed by the pressing member 506, the pressing member 506 is lowered after applying the wiping liquid, so as to release the pressed state of the wiping member 502.

Figure 11B:
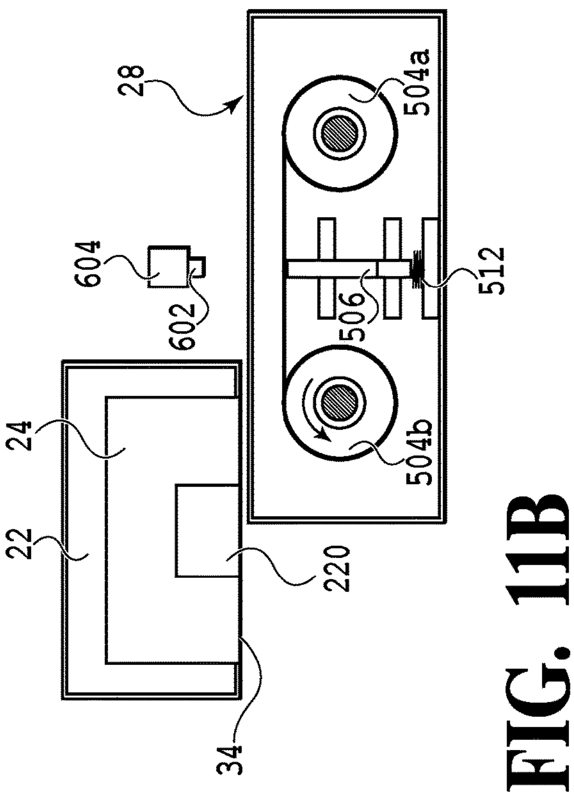

Next, the processing proceeds to S1006, and the CPU 702 drives the rotary member 504*b* to wind up the wiping member 502 by a predetermined amount (see FIG. 11B). The predetermined amount is an amount by which, if the maintenance part 28 is at the pattern printing position, the area of the wiping member 502 to which the wiping liquid is applied moves to a position where the print head 24 can perform printing. The pattern printing position is a position within the area Sc where printing on the wiping member 502 can be performed by the print head 24.

Then, the processing proceeds to S1008, and the CPU 702 makes a determination regarding the installation state of the wiping member 502, more specifically, determines whether or not the wiping member 502 is appropriately installed. Here, regarding the sensor 202, the light emitting part (not illustrated in the drawings) performs irradiation with a predetermined amount of light from R, G, and B LEDs. Therefore, the light receiving part (not illustrated in the drawings) receives reflected light corresponding to this amount of light. Therefore, in a case when the wiping member 502, which is the target of the light irradiation from the light emitting part, is not appropriately installed, the amount of light received by the light receiving part changes. For example, in a case when the wiping member 502 is slack and positioned near the sensor 202, the amount of received light increases. Further, in a case when the wiping member 502 is folded and positioned away from the sensor 202, the amount of received light decreases. Therefore, if the amount of light received by the sensor 202 is not within a predetermined range, it is determined that the wiping member 502 is not installed appropriately, that is, it is determined that the wiping member 502 is not installed in a manner where whether or not the wiping liquid is appropriately applied can be determined.

That is, in S1008, whether or not the wiping member 502 is appropriately installed is determined by determining whether or not the amount of light received by the sensor 202 is within a predetermined range. That is, if the amount of received light is within the predetermined range, it is determined that the wiping member 502 is appropriately installed, and, if the amount of received light is not within the predetermined range, it is determined that the wiping member 502 is not appropriately installed. The upper limit value and lower limit value of the predetermined range are the upper limit value and lower limit value of the amount of light received by the sensor 202 during the time where it is determined that the wiping member 502 is appropriately installed on or conveyed by the winding part 504. Further, the position at which the amount of light received by the sensor 202 is detected may be an area to which the wiping liquid has been applied, or an area to which the wiping liquid has not been applied.

Figure 11C:
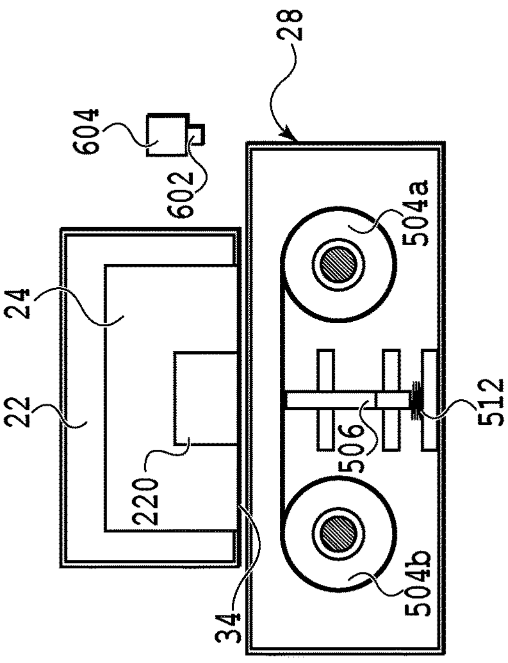
Figure 11D:
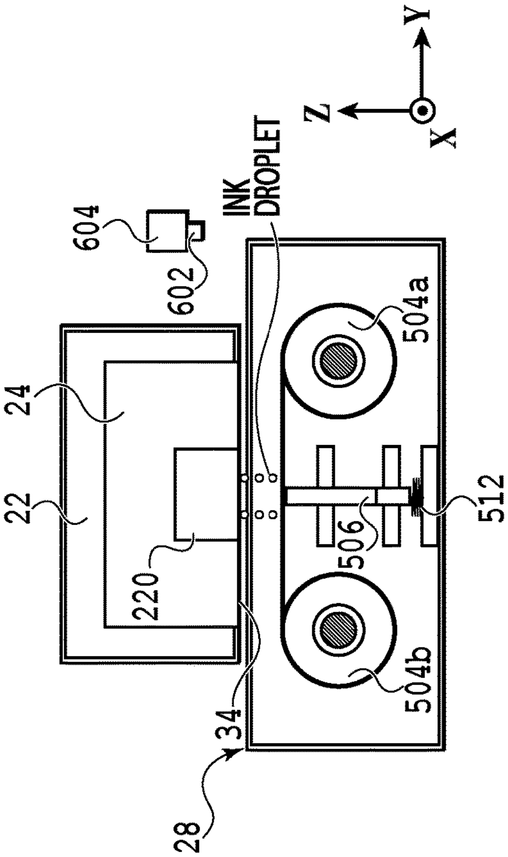

Therefore, in S1008, if the amount of light received by the sensor 202 is detected in an application area to which the wiping liquid has been applied, the maintenance part 28 is moved to a position where the sensor 202, which is moved by the carriage 22 in the X direction, will pass the application area (see FIG. 11C). Further, if the amount of light received by the sensor 202 is detected in a non-application area to which the wiping liquid has not been applied, the maintenance part 28 is moved to a position where the sensor 202, which is moved by the carriage 22 in the X direction, will pass the non-application area. After that, in S1008, the print head 24 is moved in the X direction via the carriage 22, so as to receive the reflected light of the light emitted from the light emitting part to the wiping member 502 of the maintenance part 28 and determine whether or not the wiping member 502 is appropriately installed, based on the amount of received light. Here, for example, the amount of received light is detected over the entire width of the wiping member 502 in the X direction.

If it is determined in S1008 that the amount of light received by the sensor 202 is not within the predetermined range, the processing proceeds to S1010, and the CPU 702 notifies the user via the operation panel 724 that an error has occurred in the wiping member 502, and ends this determination process. The error notification is a notification that the wiping member 502 is not appropriately installed in the maintenance part 28. Such an error notification may be performed, for example, via a display part installed in the operation panel 724 or via the host apparatus 714, or may be performed via a speaker (not illustrated in the drawings) installed in the printing apparatus 10.

Further, in S1008, if it is determined that the amount of light received by the sensor 202 is within the predetermined range, the processing proceeds to S1012, and the CPU 702 causes the print head 24 to print a predetermined pattern on the area of the wiping member 502 to which the wiping liquid has been applied (the application area). That is, in S1012, the maintenance part 28 is moved to the pattern printing position, and the print head 24 is made to perform scanning in the X direction on the wiping member 502 of the maintenance part 28 located at the pattern printing position, so as to print the predetermined pattern (see FIG. 11D). The predetermined pattern is printed with ink of a predetermined color that is printable with the print head 24, which is K ink (black ink) in the present embodiment.

Note that the printing operation for printing the predetermined pattern is not limited as such, and the printing may be performed by moving the maintenance part 28 or by moving both the print head 24 and the maintenance part 28. That is, the printing of the predetermined pattern on the wiping member 502 may be performed by relative movement of the print head 24 and the maintenance part 28. In this case, the movement mechanisms of the print head 24 and the maintenance part 28 will be changed accordingly. The predetermined pattern is multiple straight lines extending in a predetermined direction (in the present embodiment, the Y direction), and, in the present embodiment, is a pattern formed by the five lines arranged side by side in a direction (in the present embodiment, the X direction) intersecting the predetermined direction (see FIG. 12A). Note that the thickness of each line, that is, the width (the length in the X direction) of each line is made larger than the resolution of the sensor 202, for example. Further, the interval between each line, that is, the interval between adjacent lines, is made larger than the resolution of the sensor 202, for example.

After that, the processing proceeds to S1014, and the CPU 702 determines whether or not a predetermined time has elapsed, and, if it is determined that the predetermined time has not elapsed, the processing returns to S1014. The predetermined time is, for example, a time period in which the ink of the predetermined pattern bleeds due to the appropriately applied wiping liquid so that whether the wiping liquid has been appropriately applied can be determined based on the detection result from the sensor 202. The predetermined time varies depending on the type of ink, the type of wiping liquid, the type of wiping member, etc., and is determined in experiments, for example. If it is determined in S1014 that the predetermined time has elapsed, the processing proceeds to S1016, and the CPU 702 determines whether or not the wiping liquid is appropriately applied to the wiping member 502.

In S1016, first, the sensor 202 is made to perform scanning on the maintenance part 28, which is located at the pattern printing position, in the X direction via the carriage 22, so that the sensor 202 detects the concentration distribution of the printed predetermined pattern. Further, in S1016, whether or not the wiping liquid is appropriately applied is determined based on the detected concentration distribution. Here, the maintenance part 28 is not limited to being located at the pattern printing position. The maintenance part 28 is moved according to the installation position of the sensor 202 on the carriage 22. The detection operation for detecting the concentration distribution of the predetermined pattern is not limited to the one described above, and the maintenance part 28 may be moved, or both the sensor 202 and the maintenance part 28 may be moved. That is, the concentration distribution of the predetermined pattern printed on the wiping member 502 may be detected by relative movement of the sensor 202 and the maintenance part 28, and, in this case, the movement mechanisms of the sensor 202 and the maintenance part 28 will be changed accordingly.

Figure 12A:
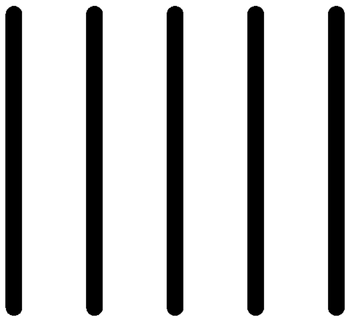
FIG. 12A to FIG. 12C are diagrams illustrating bleeding of a predetermined pattern according to the application amounts of wiping liquid.
Figure 12B:
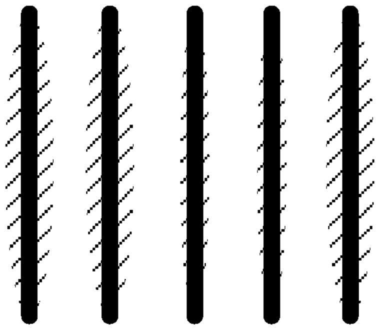
Figure 12C:
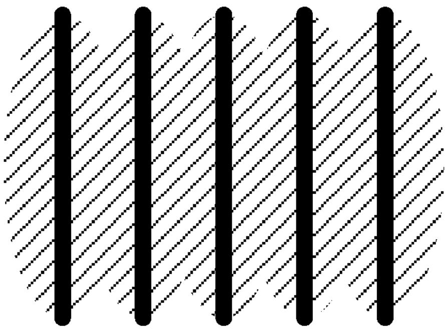

Here, the wiping liquid is applied to the wiping member 502 on which the predetermined pattern has been printed. FIG. 12A to FIG. 12C are diagrams illustrating the predetermined pattern printed on the wiping member depending on the application amount of the wiping liquid. On the wiping member 502 to which the wiping liquid is not applied, each line of the predetermined pattern is formed without bleeding, as in FIG. 12A. On the other hand, in a case when the wiping liquid is appropriately applied, each line in the predetermined pattern bleeds due to the wiping liquid that has permeated the wiping member 502 (see FIG. 12C). Further, in a case when the wiping liquid is applied but its amount is not appropriate, i.e., in a case when the application amount is small, the small amount of wiping liquid that has penetrated the wiping member 502 causes bleeding on each line in the predetermined pattern (FIG. 12B). However, the extent of the bleeding is smaller than the case when the wiping liquid is appropriately applied.

In a case when the wiping liquid is appropriately applied, the bleeding of each line of the predetermined pattern becomes large, and, in each line, the area with high ink concentration spreads in the width direction (the X direction) (see FIG. 12C). Therefore, in the area where the predetermined pattern is printed, the width of the line with a certain ink concentration or higher becomes wider. On the other hand, in a case when the wiping liquid is not applied, there is no bleeding in each line of the predetermined pattern, and the area with high ink concentration in each line is narrower in the width direction (see FIG. 12B) compared to the case where the wiping liquid is applied. Further, in the case when a small amount of wiping liquid is applied, the line width becomes wider due to bleeding, compared to the line width of the case when the wiping liquid is not applied, but is narrower than the line width of the case where the wiping liquid is appropriately applied.

Figure 13:
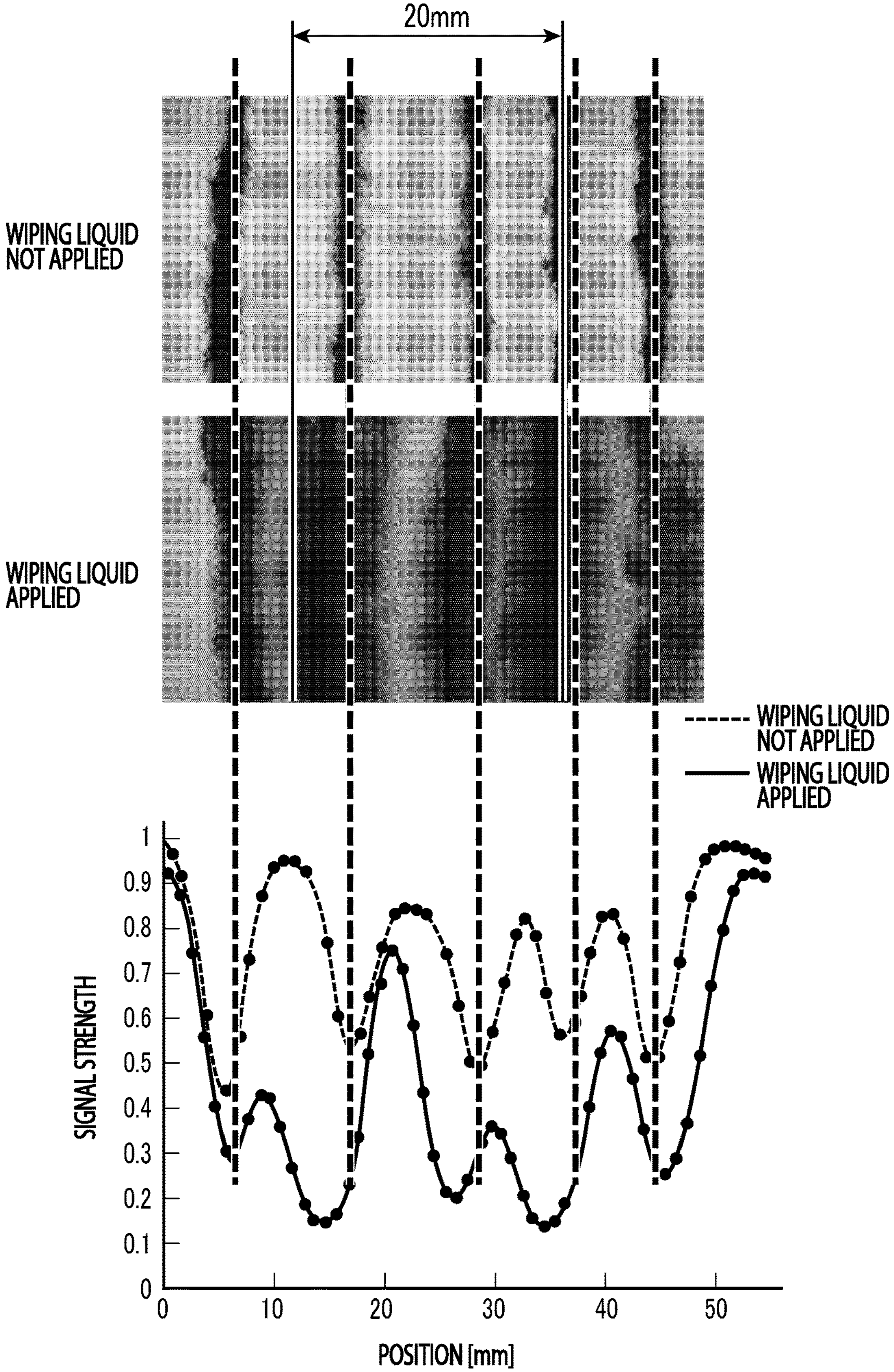
FIG. 13 is a diagram illustrating signal values from a sensor according to whether the wiping liquid is applied or not applied to the predetermined pattern.

The sensor 202 detects the predetermined pattern while moving in the X direction via the carriage 22. Therefore, in a case when the wiping liquid is not applied, the ink concentration distribution in the X direction is relatively steep, and, in a case when the wiping liquid is appropriately applied, the ink concentration distribution in the X direction is relatively gradual (see FIG. 13). FIG. 13 is a diagram illustrating the difference in concentration distribution between a predetermined pattern printed on the wiping member to which the wiping liquid is not applied and a predetermined pattern printed on the wiping member to which the wiping liquid is appropriately applied. In the present embodiment, since the K ink is ejected to the wiping member which is nearly white, the reflected light increases and thus the signal value (signal strength) increases in the area where the K ink is not applied, and the reflected light decreases and thus the signal value decreases in the area where the K ink is applied.

Therefore, in S1016, whether or not the wiping liquid is appropriately applied to the wiping member 502 is determined by detecting the change in ink concentration in the area where the predetermined pattern is printed. In S1016, the determination is made using a processing value stored in the memory 708 for converting the signal value obtained from the sensor 202 and a threshold value for determining whether or not the wiping liquid is appropriately applied.

The processing value is a value used for converting the obtained ink concentration value into a more simplified value, which represents bipolar information of the white background (the color corresponding to the color of the wiping member) and the black background (the color corresponding to the ink color).

Figure 14A:
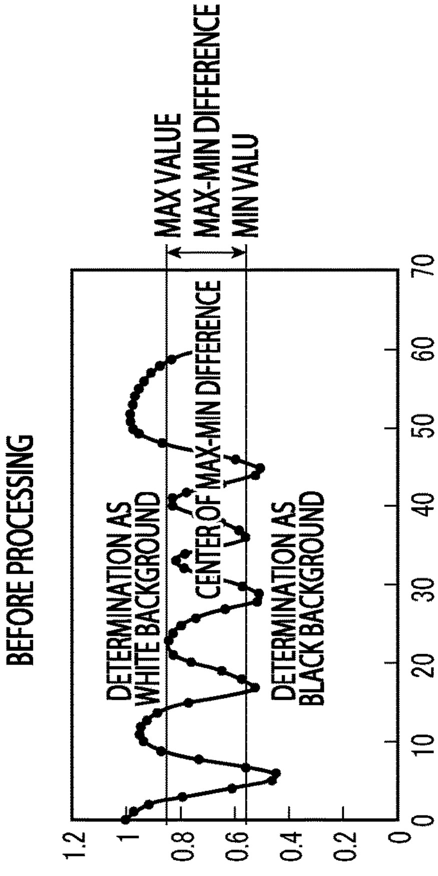
FIG. 14A to FIG. 14D are diagrams for explaining a method of processing the signal values from the sensor.

FIG. 14A is a graph illustrating the ink concentration distribution in the X direction in a case when the predetermined pattern is printed with K ink on the wiping member to which the wiping liquid is not applied. According to this concentration distribution graph, the value corresponding to the center of the difference between the upper limit value and lower limit value of the signal values at the positions corresponding to the respective lines (the intermediate value between the upper limit value and lower limit value) is set as the processing value. The upper limit value of the signal values may be, for example, the most common signal value in the positions corresponding to the intervals of lines, or may be the average value of the signal values. Further, the lower limit value of the signal values may be, for example, the most common signal value in the positions corresponding to the lines, or may be the average value of the signal values.

Figure 14C:
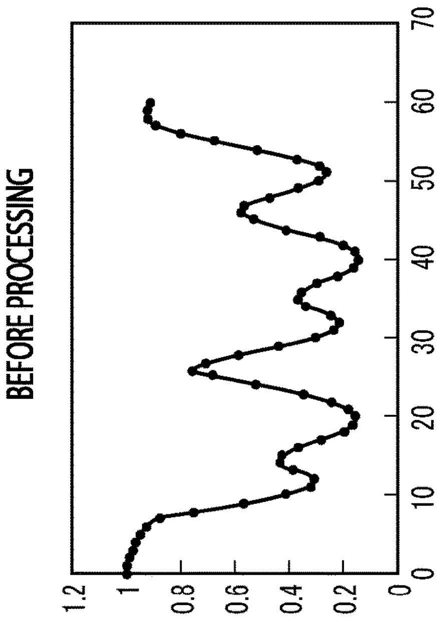
Figure 14B:
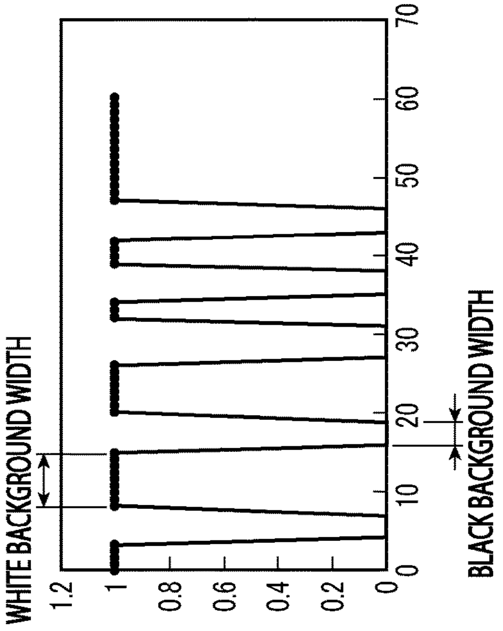

Then, if the graph of the ink concentration distribution of FIG. 14A is polarized using this processing value, the graph as in FIG. 14B can be obtained. FIG. 14B is a graph obtained by polarizing the signal values in the graph of FIG. 14A. Whether or not a signal value in FIG. 14A is equal to or greater than the processing value is determined, so that, if the signal value is equal to or greater than the processing value, the signal value is converted as "1" representing the white background, and, if the signal value is less than the processing value, the signal value is converted as "0" representing the black background. Since FIG. 14A corresponds to the predetermined pattern printed on the wiping member to which the wiping liquid is not applied, in FIG. 14B, the widths of the black background corresponding to the color of the ink forming the lines are short, and the widths of the white background corresponding to the color of the wiping member between the line patterns are long.

Figure 14D:
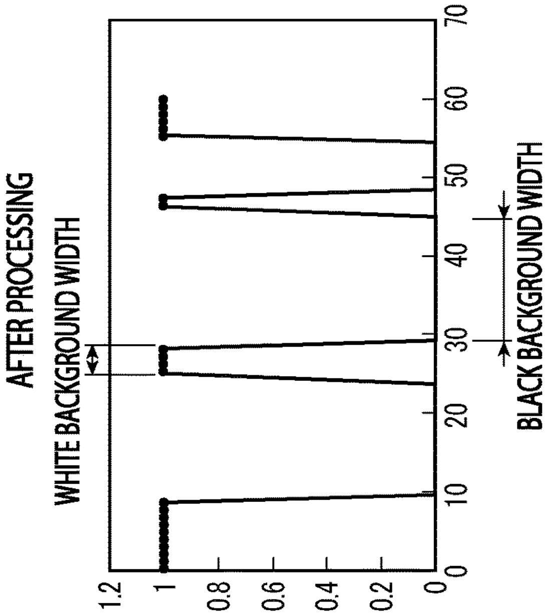

Similarly, as for the predetermined pattern printed using K ink on the wiping member 502 to which the wiping liquid is appropriately applied, a graph is created by polarizing the graph of the ink concentration distribution using the processing value, so as to obtain the black background widths. FIG. 14C is a graph illustrating the ink concentration distribution in the X direction in a case where the predetermined pattern is printed with K ink on the wiping member to which the wiping liquid is appropriately applied. FIG. 14D is a graph obtained by polarizing the signal values in the graph of FIG. 14C. The graph of FIG. 14D is obtained by converting the signal values in the graph of FIG. 14C with the processing value. In the area where the predetermined pattern is printed on the wiping member to which the wiping liquid is appropriately applied, bleeding appears on each line forming the predetermined pattern, and thus, the detection result from the sensor 202 is as illustrated in FIG. 14C. Furthermore, in the graph of FIG. 14D which is obtained by processing FIG. 14C, the black widths corresponding to the color of the ink forming the lines are long, and the white widths corresponding to the color of the wiping member between the line patterns are short.

Therefore, in the present embodiment, a black background width at which it can be determined that the wiping liquid is appropriately applied based on ink bleeding is retained as a threshold value. This threshold value may be the average value of the multiple black background widths obtained in FIG. 14D, or may be the minimum black background width. Further, this threshold value is may be set to match a black background width obtained in FIG. 14D, or may be a value less than a black background width by a predetermined amount.

Therefore, in S1016, first, the change in ink concentration in the area where the predetermined pattern is printed is detected. Next, the detected signal values are converted based on the processing value to polarize the ink concentration distribution. After that, in the polarized state, whether or not the length of the black background widths corresponding to the color of the ink forming the lines are equal to or greater than the threshold value. Then, if it is determined that the black background widths are equal to or greater than the threshold value, it is determined that the wiping liquid is appropriately applied to the wiping member 502. Further, if it is determined that the black background widths are less than the threshold value, it is determined that the wiping liquid is not appropriately applied to the wiping member 502.

Note that, in S1016, the determination is made using the processing value retained in the memory 708 and the threshold value based on a black background width obtained in a case when the wiping liquid is appropriately applied to the wiping member 502. However, there is not a limitation as such. It is also possible that the information about the time where the predetermined pattern is printed on the wiping member to which the wiping liquid is not applied (that is, the graphs illustrated in FIG. 14A and FIG. 14B) is retained, so that the determination is made based on the information in S1016. In this case, using a black background width based on FIG. 14B as the threshold value, for example, if the length of the obtained black background width is greater than the threshold value, it is determined that the wiping liquid is applied, and, for example, if the length is greater than the threshold value by a certain amount, it is determined that the wiping liquid is appropriately applied.

Returning to FIG. 10, the explanation is continued. If it is determined in S1016 that the wiping liquid is appropriately applied to the wiping member 502, this determination process ends. Further, if it is determined in S1016 that the wiping liquid is not appropriately applied to the wiping member 502, the processing proceeds to S1018, and the CPU 702 informs the user via the operation panel 724 that an error has occurred in application of the wiping liquid, and ends this determination process. The error notification related to the wiping liquid is, for example, a notification that the wiping liquid is not appropriately applied to the wiping member. Errors related to the wiping liquid may be informed via a display part installed on the operation panel 724 or the host apparatus 714, or via a speaker (not illustrated in the drawings) installed in the printing apparatus 10. Note that, after the determination process ends, the maintenance part 28 returns to the standby position under the control of the CPU 702.

Note that, in the above-described determination process, although whether or not the wiping liquid is appropriately applied to the wiping member 502 is determined as the determination regarding the wiping liquid application state of the wiping member 502, there is not a limitation as such. The amount of wiping liquid ejected from the liquid ejection parts 602 may decrease in a case when the printing apparatus 10 is installed in a low temperature environment or in a case when the viscosity of the wiping liquid increases due to evaporation of the wiping liquid from the liquid ejection parts 602. Therefore, in the above-described determination process, whether or not the application amount of wiping liquid to the wiping member 502 is appropriate may be determined. Determining whether or not the application amount of wiping liquid to the wiping member is appropriate is, in other words, determining whether or not the application amount of wiping liquid to the wiping member is an amount that cannot obtain the effect of the wiping liquid. In this case, the above-described threshold value is set as a first threshold value, and a value less than the first threshold value is set as a second threshold value. That is, the second threshold value is a value with which it can be determined that the application amount of wiping liquid to the wiping member is not an appropriate amount, and, for example, the second threshold value is a value corresponding to a black background width of FIG. 14B. Furthermore, if the length of the black background width is less than the first threshold value and greater than the second threshold value, it is determined that the application amount of wiping liquid is not appropriate. Moreover, if the length is less the second threshold value, it is determined that the wiping liquid has not been ejected. Accordingly, in the printing apparatus 10, whether or not the wiping liquid is appropriately applied can be determined in more details, that is, whether or not the application amount of wiping liquid is within an appropriate range and whether or not the wiping liquid has not been ejected can be determined.

Functional Effects of the Present Embodiment

As explained above, in the printing apparatus 10, as a determination process for determining the state of application of the wiping liquid to the wiping member 502, whether or not the wiping liquid is appropriately applied is determined at a predetermined timing. In this determination process, a wiping liquid is applied onto the wiping member 502, a predetermined pattern configured with multiple straight lines is printed with a predetermined ink, and the concentration distribution of the ink in an area where the predetermined pattern is printed is detected. Accordingly, if the wiping liquid is appropriately applied, a certain amount of bleeding occurs in the printed predetermined pattern. In the present embodiment, the thickness of a line including this bleeding is detected based on the detected ink concentration distribution, and, based on this detection result, whether or not the wiping liquid is appropriately applied and whether or not the application amount of the wiping liquid is appropriate is determined. Accordingly, it becomes possible to detect with high accuracy whether or not the colorless (almost colorless) and transparent wiping liquid is appropriately applied to the wiping member 502.

Further, in the present embodiment, the sensor 202 detects the amount of received light from the wiping member 502 before printing a predetermined pattern and applying the wiping liquid to the wiping member 502. Accordingly, it becomes possible to determine whether or not the wiping member 502 is appropriately installed, and thus, before executing the process of determining whether or not the wiping liquid is appropriately applied, an inappropriate state for the determination can be detected. Therefore, it becomes possible to suppress the consumption amounts of the wiping member, wiping liquid, and ink.

Other Embodiments

Note that the above-described embodiments may be modified as shown in the following (1) through (8).

(1) In the above-described embodiment, after applying the wiping liquid to the predetermined area of the wiping member 502, the predetermined pattern is printed in the predetermined area. However, there is not a limitation as such. It is also possible that, after the predetermined pattern is printed on the predetermined area of the wiping member 502, the wiping liquid is applied to the predetermined area. Further, in the above-described embodiment, in the determination process, before printing the predetermined pattern, the amount of light received by the sensor is detected, in order to determine whether or not the wiping member 502 is appropriately installed. However, such a process may be omitted.

(2) In the above-described embodiment, the predetermined pattern is formed with five straight lines extending in the Y direction being arranged side by side in the X direction. However, there is not a limitation as such. The predetermined pattern may be formed with only one straight line extending in the Y direction, or may be formed with two to four, or six or more straight lines extending in the Y direction.

Figure 15:
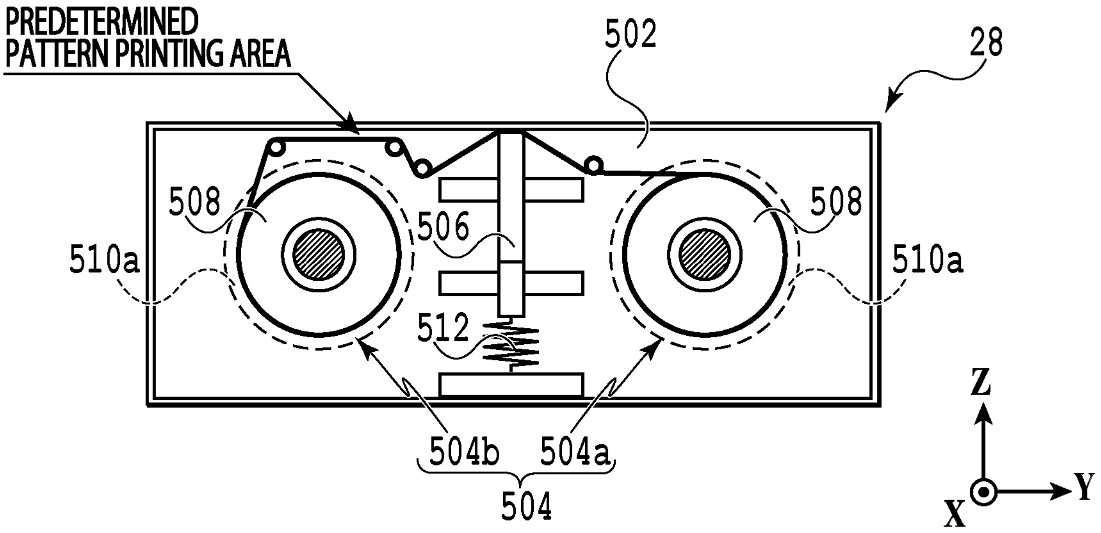
FIG. 15 is a diagram for explaining a modification example of the maintenance part.

(3) Although not specifically described in the above embodiment, the maintenance part 28 may have such a configuration with which the area of the wiping member 502 where the predetermined pattern is printed is made parallel to the XY plane (see FIG. 15). Further, for example, such a configuration may be configured so that, as the area faces the ejection port surface 34 of the print head 24, the distance between the area and the ejection port surface 34 becomes an appropriate distance for printing performed by the print head 24. Accordingly, the printing accuracy of the predetermined pattern is improved, and the detection accuracy of application of the wiping liquid is improved.

(4) In the above-described embodiment, whether or not the wiping liquid is appropriately applied to the wiping member 502 is determined based on the thickness of each line configuring the predetermined pattern as it bleeds. However, there is not a limitation as such. For example, the average value of the concentration of the area in which the predetermined pattern is formed may be obtained, and the above-described determination may be executed based on the average value. In a case where the wiping liquid is appropriately applied to the wiping member 502, each line bleeds and the area with high concentration increases. Therefore, it is determined that the wiping liquid is appropriately applied in a case when the above-described average value is equal to or greater than a predetermined value, and it is determined that the wiping liquid is not appropriately applied in a case when the above-described average value is less than the predetermined value. Such a predetermined value is determined in experiments, for example.

Alternatively, the above-described determination may be executed based on the difference between detected values detected by the sensor 202. In this case, the ink concentration distribution in the area where the predetermined pattern is printed on the wiping member 502 to which the wiping liquid is not applied is retained. Then, the above-described determination is made based on the difference value between, for example, the detected value of a peak portion (a peak value) in the area where the predetermined pattern is printed, which is detected in a determination process, and the detected value of the corresponding position, which has been retained. In a case when the wiping liquid is appropriately applied to the wiping member 502, each line bleeds, and thus the peak value of each line becomes small. Therefore, it is determined that the wiping liquid is appropriately applied in a case when the above-described peak value is less than a predetermined value, and it is determined that the wiping liquid is not appropriately applied in a case when the above-described peak value is equal to or greater than the predetermined value.

(5) In the above-described embodiment, the sensor 202 is mounted on the carriage 22. However, there is not a limitation as such. The sensor 202 may be configured with multiple optical sensors fixedly arranged side by side with a width that allows reading of the predetermined pattern printed on the wiping member 502. Alternatively, such a configuration in which the sensor 202 is mounted on a movement mechanism separate from the carriage 22 so that the sensor 202 moves relative to the maintenance part 28 is also possible.

(6) In the above-described embodiment, the state of application of the wiping liquid to the wiping member 502 is determined based on a black background width corresponding to the lines printed on the wiping member 502, which is obtained after converting the signal values from the sensor 202. However, there is not a limitation as such. The above-described state of application may be determined based on a white background width corresponding to the wiping member 502 on which no line is printed, which is obtained after converting the signal values from the sensor 202.

(7) In the above-described embodiment, if it is determined in the process of S1016 of the determination process that the wiping liquid is not appropriately applied, an error notification related to the wiping liquid is immediately provided. However, there is not a limitation as such. For example, the wiping liquid is supplied to the liquid application part 600 that applies the wiping liquid to the wiping member 502 from a wiping liquid tank that stores the wiping liquid via the tube 604 using a pressure-applying mechanism. In a case when the mechanism for supplying the wiping liquid to the liquid application part 600 does not function appropriately, it is also determined in the process of S1016 that the wiping liquid is not applied appropriately. Therefore, the determination process may include a process of checking the function of the supply mechanism.

Figure 18:
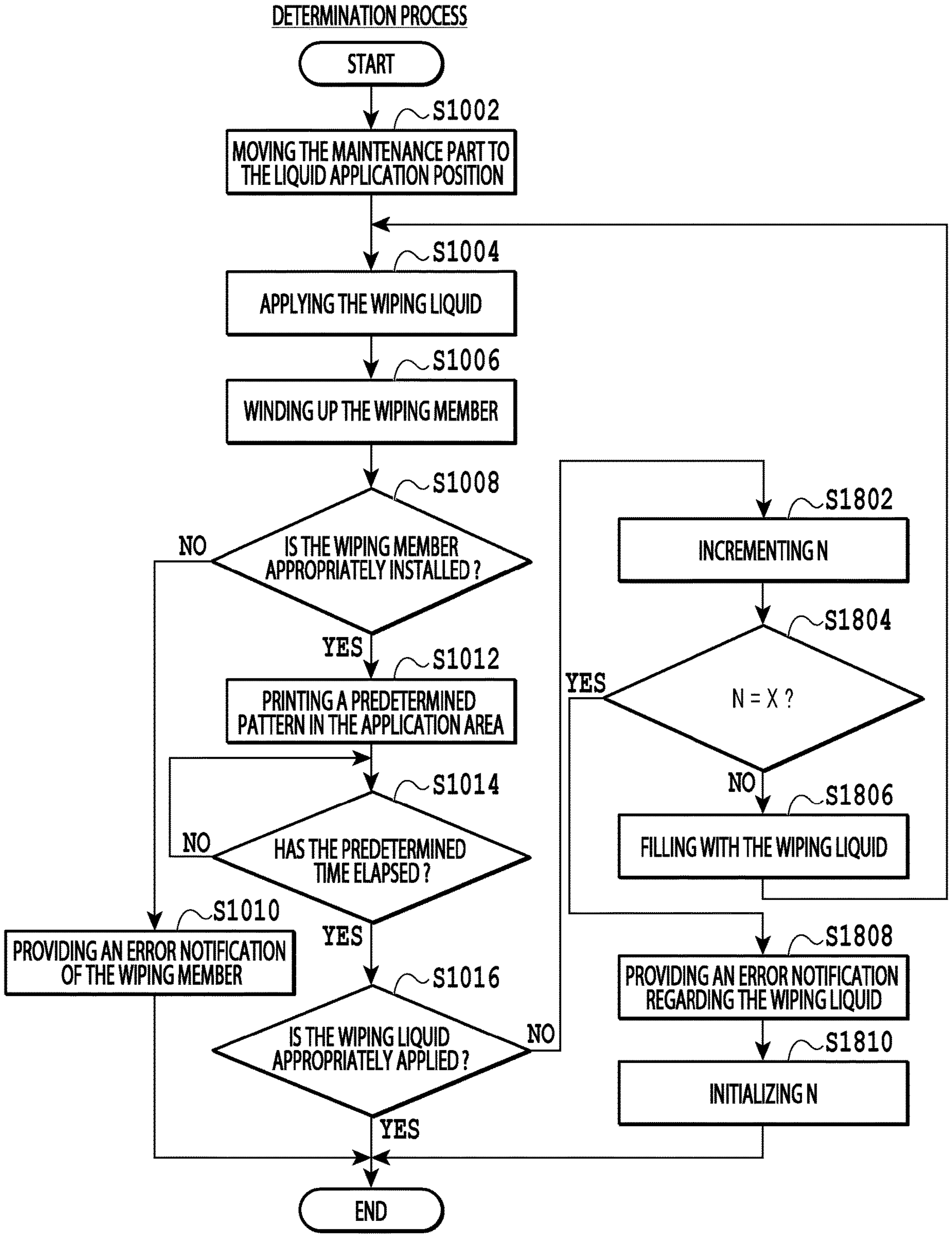
FIG. 18 is a flowchart of a modification example of the determination process.

FIG. 18 is a flowchart illustrating details of processing of a modification example of the determination process. Note that, regarding FIG. 18, the processing with the same details of processing as those in the determination process of FIG. 10 is assigned with the same step numbers as the numbers used in the determination process of FIG. 10, so as to omit the detailed explanations thereof. In the determination process of FIG. 18, if it is determined in S1016 that the wiping liquid is not appropriately applied, the processing proceeds to S1802, and the CPU 702 increments the variable N representing the number of times the liquid application part 600 in the determination process has been filled with the wiping liquid. Next, the processing proceeds to S1804, and the CPU 702 determines whether or not the variable N is equal to the predetermined value X. The predetermined value X is a preset value representing the number of times it is determined that a failure in filling the liquid application part 600 with the wiping liquid is caused by the supply mechanism, and its value is determined in experiments, for example.

If it is determined in S1804 that the variable N is not equal to the predetermined value X, the processing proceeds to S1806, and the CPU 702 drives the supply mechanism to fill the liquid application part 600 with the wiping liquid, and returns to S1004. Further, if it is determined in S1804 that the variable Nis equal to the predetermined value X, the processing proceeds to S1808, and the CPU 702 issues a notification of an error related to the wiping liquid, initializes the variable N in S1810, and ends this determination process. The error related to the wiping liquid, whose notification is issued in S1808, may include, not only a notification that the wiping liquid is not appropriately applied to the wiping member, but also a notification that the wiping liquid supply mechanism for filling the liquid application part 600 with the wiping liquid may not function appropriately, for example.

By performing such a determination process, notifications of an error in a case when the liquid application part 600 is not sufficiently filled with the wiping liquid are suppressed. Note that, in the determination process of FIG. 18, in a case when it is determined in S1016 that the wiping liquid is not appropriately applied, the processing may be returned to S1004 a predetermined number of times without filling of the wiping liquid.

(8) The above-described embodiment and various kinds of forms shown in (1) through (7) may be combined as appropriate. The present invention can be implemented by processing of supplying a program for implementing one or more functions of the above-described embodiment to a system or an apparatus via a network or a storage medium, so that one or more processors in a computer of the system or the apparatus read out and execute the program. Further, implementation by use of a circuit (for example, an ASIC) for implementing one or more functions is also possible.

(Results of Experiments)

Here, an explanation is given of the results of experiments conducted by the inventor of the present application using the above-described printing apparatus 10. FIG. 16A is a table illustrating the compositions of the inks used in the experiments conducted by the inventor of the present application, and FIG. 16B is a table illustrating the compositions of the wiping liquids used in the experiments conducted by the inventor of the present application. FIG. 17 is a table illustrating the results of the experiments conducted by the inventor of the present application.

<Ink and Wiping Liquid>

In the present experiments, one of the inks with the compositions illustrated in FIG. 16A, i.e., Ink 1, Ink 2, Ink 3, and Ink 4, was used. To prepare each of these four types of ink, each component (unit: %) illustrated in FIG. 16A was mixed and thoroughly stirred, and then the mixture was filtered under pressure using a cellulose acetate filter with a pore size of 3.0 μm (manufactured by Advantech). "BYK-333" is the product name of a surfactant manufactured by Big Chemie Japan Co., Ltd. In addition, in the present experiments, a wiping liquid with the composition illustrated in FIG. 16B was used. To prepare the wiping liquid, each component (unit: %) illustrated in FIG. 16B was mixed and thoroughly stirred, and then the mixture was filtered under pressure using a cellulose acetate filter with a pore size of 3.0 μm (manufactured by Advantech). "ACETYLENOL E100" is the product name of a surfactant manufactured by Kawaken Fine Chemicals. The ink and wiping liquid used were adjusted to 100% with pure water.

Note that the methods for preparing the pigment dispersion liquids and the resin fine particle dispersion liquid are as described below.

=Preparation of the Pigment Dispersion Liquids=

Pigment Dispersion Liquid 1

A styrene-ethyl acrylate-acrylic acid copolymer (Resin 1) with an acid value of 150 mgKOH/g and a weight average molecular weight of 8,000 was prepared. After neutralizing Resin 1 of 20.0 parts with potassium hydroxide equimolar to its acid value, an appropriate amount of pure water was added to prepare a Resin 1 aqueous solution with a resin content (solid content) of 20.0%. A mixture was obtained by mixing a pigment (C.I. Pigment Blue 15:3) of 10.0 parts, the Resin 1 aqueous solution of 15.0 parts, and pure water of 75.0 parts. The obtained mixture and zirconia beads of 200 parts with a diameter of 0.3 mm were charged into a batch type vertical sand mill (manufactured by Imex) and dispersed for 5 hours while cooling with water. After removing coarse particles by centrifuge separation, filtering under pressure was performed using a cellulose acetate filter with a pore size of 3.0 μm (manufactured by Advantech), thereby preparing the pigment dispersion liquid 1 with the a pigment content of 10.0% and a resin dispersant (Resin 1) content of 3.0%.

Pigment Dispersion Liquid 2

In the same procedure as that of the above-described pigment dispersion liquid 1 except for changing the pigment to C.I. Pigment Red 122, the pigment dispersion liquid 2 with a pigment content of 10.0% and a resin dispersant (Resin 1) content of 3.0% was prepared.

Pigment Dispersion Liquid 3

In the same procedure as that of the above-described pigment dispersion liquid 1 except for changing the pigment to C.I. Pigment Yellow 74, the pigment dispersion liquid 3 with a pigment content of 10.0% and a resin dispersant (Resin 1) content of 3.0% was prepared.

Pigment Dispersion Liquid 4

In the same procedure as that of the above-described pigment dispersion liquid 1 except for changing the pigment to carbon, the pigment dispersion liquid 4 with a pigment content of 10.0% and a resin dispersant (Resin 1) content of 3.0% was prepared.

=Preparation of the Resin Fine Particle Dispersion Liquid=

In a four-necked flask equipped with a stirrer, a reflux condenser, and a nitrogen gas introduction tube, ion-exchanged water of 74.0 parts and potassium persulfate of 0.2 parts were mixed. Further, ethyl methacrylate of 24.0 parts, methacrylic acid of 1.5 parts, and a reactive surfactant (the product name "Aqualon KH-05", manufactured by Daiichi Kogyo Seiyaku Co., Ltd.) of 0.3 parts were mixed to prepare an emulsion. Under a nitrogen atmosphere, the prepared emulsion was dropped into the above-mentioned four-necked flask over 1 hour, and a polymerization reaction was carried out at 80° C. for 2 hours while stirring. After cooling it to 25° C., ion-exchanged water and an aqueous solution containing potassium hydroxide equimolar to the acid value of the resin particles were added, so as to prepare the resin fine particle dispersion liquid with a resin particle content (solid content) of 25.0%.

<Evaluation Method>

In addition, in the present experiments, multiple exemplary embodiments and comparative examples with different inks, patterns, sensors, detection methods, and detection of the amount of received light were evaluated with respect to three points: non-ejection determination, inappropriateness determination, and installation determination.

Ink 1, Ink 2, Ink 3, and Ink 4 described above were used as the inks for printing patterns. The patterns printed on the wiping member included no line, one line, multiple lines (5 lines), and multiple lines (5 lines) with narrowed line width and line interval. Regarding sensors, in the printing apparatus 10, multiple sensors fixedly arranged in an area where the pattern printed on the wiping member can be read and a sensor mounted on the carriage 22 were used. The detection methods used were the "DETECTED VALUE DIFFERENCE" method that uses the difference in signal values read by the sensor, the "LINE THICKNESS" method that is based on the line thickness including bleeding as in the above-described embodiment, and the "AVERAGE CONCENTRATION CHANGE" method that is based on the variation of the average value of ink concentration in the area where the pattern is formed. Detection of the amount of received light (corresponding to the process of S1008 in the above-described embodiment) was to determine whether or not the amount of received light detected by the sensor is within a predetermined range, and evaluation was conducted for a case where the detection was executed and a case when the detection was not executed.

In the non-ejection determination, based on determination results from the sensors and visual inspection, whether or not the determination of non-ejection of the wiping liquid is successfully made was determined. In the inappropriateness determination, based on determination results from the sensors and visual inspection, whether or not the determination that the application amount of the wiping liquid is not appropriate is successfully made was determined. In the installation determination, based on determination results from the sensors and visual inspection, whether or not the wiping member is appropriately installed was determined.

The non-ejection determination was evaluated as follows.

AA: The determination of non-ejection of the wiping liquid was successfully made in the entire area of the wiping member.

A: The determination of non-ejection of the wiping liquid was successfully made in a part of the wiping member.

B: The determination of non-ejection of the wiping liquid was successfully made in a part of the wiping member. However, the determination was not successfully made unless it was immediately after the application.

C: The determination was not successfully made.

Further, the inappropriateness determination was evaluated as follows.

AA: The determination that the application amount of the wiping liquid is not appropriate was successfully made in the entire area of the wiping member.

A: The determination that the application amount of the wiping liquid is not appropriate was successfully made in a part of the wiping member.

B: The determination that the application amount of the wiping liquid is not appropriate was successfully made in a part of the wiping member. However, the determination was not successfully made unless it was immediately after the application.

C: The determination was not successfully made.

Furthermore, the installation determination was evaluated as follows.

AA: The determination that an installation error has occurred was successfully made in the entire area of the wiping member.

A: The determination that an installation error has occurred was successfully made in a part of the wiping member.

B: The determination that an installation error has occurred was successfully made in a part of the wiping member. However, the determination was not successfully made unless it was immediately after the application.

C: The determination was not successfully made.

Note that the above-mentioned evaluation values "AA", "A", and "B" are acceptable levels, and "C" is an unacceptable level. That is, in a case when either the non-ejection determination or the inappropriateness determination results in the evaluation value "C", it is determined that appropriate application of the wiping liquid to the wiping member cannot be detected with high accuracy.

Considerations Based on the Evaluation Results

Referring to the results of the experiments in EXEMPLARY EMBODIMENT 4 and EXEMPLARY EMBODIMENT 5, in which the patterns used were different and the other conditions were the same, the evaluation value in the inappropriateness determination was higher in EXEMPLARY EMBODIMENT 5, in which a pattern formed with multiple lines was used, than in EXEMPLARY EMBODIMENT 4, in which a pattern formed with one line was used. Specifically, in EXEMPLARY EMBODIMENT 4, the non-ejection determination resulted in “AA” and the inappropriate determination resulted in “A”, and, in EXEMPLARY EMBODIMENT 5, the non-ejection determination and the inappropriateness determination resulted in “AA”. From the results, it can be seen that, although it is possible to perform the non-ejection determination and the inappropriateness determination even with the pattern formed with one line based on bleeding of the line, the non-ejection determination and the inappropriateness determination can be performed with higher accuracy if the pattern formed with multiple lines is used.

Further, the explanation continues with reference to the results of the experiments in EXEMPLARY EMBODIMENT 5 and COMPARATIVE EXAMPLE 2, in which the pattern widths were different and the other conditions were the same. In the results of these experiments, the evaluation values were more favorable in EXEMPLARY EMBODIMENT 5, in which the width of the multiple lines and the interval between adjacent lines were larger than the resolution of the sensor, than in COMPARATIVE EXAMPLE 2, in which the width and interval were smaller than the resolution of the sensor. Specifically, in COMPARATIVE EXAMPLE 2, the non-ejection determination resulted in “B” and the inappropriate determination resulted in “C”, and, in EXEMPLARY EMBODIMENT 5, the non-ejection determination and the inappropriateness determination resulted in “AA”. From the results, it can be seen that the non-ejection determination and the inappropriateness determination cannot be executed unless the width of the lines and the interval of the lines are larger than the resolution of the sensor.

Furthermore, referring to the results of the experiments in EXEMPLARY EMBODIMENT 2 and EXEMPLARY EMBODIMENT 4, in which the sensor arrangements were different and the other conditions were the same, the evaluation in the non-ejection determination was more favorable in EXEMPLARY EMBODIMENT 4, in which the sensor was made to perform scanning for detection, than in EXEMPLARY EMBODIMENT 2, in which the multiple sensors were fixedly arranged. Specifically, in EXEMPLARY EMBODIMENT 2, the non-ejection determination resulted in “A” and the inappropriate determination resulted in “A”, and, in EXEMPLARY EMBODIMENT 4, the non-ejection determination resulted in “AA and the inappropriateness determination resulted in “A”. From the results, it can be seen that, although it is possible to perform the non-ejection determination and the inappropriateness determination with detection performed by fixedly-arranged multiple sensors, the non-ejection determination and the inappropriateness determination can be executed with higher accuracy if a sensor is made to perform scanning for detection.

Furthermore, referring to EXEMPLARY EMBODIMENT 1, EXEMPLARY EMBODIMENT 2, and EXEMPLARY EMBODIMENT 3, in which the detection methods were different and the other conditions were the same, the evaluation values were more favorable in EXEMPLARY EMBODIMENT 2 and EXEMPLARY EMBODIMENT 3, in which detected values were processed for the determinations, than in EXEMPLARY EMBODIMENT 1, in which detected values were directly used. From the results, it can be seen that, although it is possible to perform the non-ejection determination and the inappropriateness determination by directly using the detected values from the sensor, the non-ejection determination and the inappropriateness determination can be executed with higher accuracy if the detected values from the sensor are processed for the determinations.

Further, referring to EXEMPLARY EMBODIMENT 6, EXEMPLARY EMBODIMENT 7, EXEMPLARY EMBODIMENT 8, and EXEMPLARY EMBODIMENT 9, in which the types of ink were different and the other conditions were the same, the evaluation in the inappropriateness determination was more favorable in EXEMPLARY EMBODIMENT 6, in which the black color K ink was used, than in the other exemplary embodiments. Specifically, in EXEMPLARY EMBODIMENT 6, the non-ejection determination resulted in “AA” and the inappropriate determination resulted in “AA”, and, in EXEMPLARY EMBODIMENTS 7 to 9, the non-ejection determination resulted in “AA and the inappropriateness determination resulted in “A”. From the results, it can be seen that, although it is possible to perform the non-ejection determination and the inappropriateness determination with any ink, the non-ejection determination and the inappropriateness determination can be executed with higher accuracy if the K ink is used.

Furthermore, in each exemplary embodiment and comparative example, the installation determination resulted in the evaluation value “AA” if the detection of the amount of received light was performed, and the installation determination resulted in the evaluation value “C” if the detection of the amount of received light was not performed. From the results, it can be seen that the installation determination cannot be executed with accuracy if the detection of the amount of received light is not performed.

Furthermore, referring to EXEMPLARY EMBODIMENT 1 and COMPARATIVE EXAMPLE 1, in which the presence or absence of the pattern printing was different and the other conditions were the same, the evaluation in the inappropriateness determination was more favorable in EXEMPLARY EMBODIMENT 1, in which the pattern was printed, than in COMPARATIVE EXAMPLE 1, in which the pattern was not printed. Specifically, in EXEMPLARY EMBODIMENT 1, the non-ejection determination resulted in “B” and the inappropriate determination resulted in “B”, and, in COMPARATIVE EXAMPLE 1, the non-ejection determination resulted in “B” and the inappropriateness determination resulted in “C”. From the results, it can be seen that, although it is possible to perform the non-ejection determination with no pattern printed, the non-ejection determination and the inappropriateness determination can be executed if a pattern was printed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A printing apparatus comprising:

a printing unit configured with an ejection port surface for ejecting ink;

a wiping unit configured to wipe the ejection port surface using a wiping member by relative movement with the printing unit;

an application unit configured to apply a wiping liquid to the wiping member;

a detection unit configured to detect the ink on the wiping member; and a control unit configured to cause the printing unit to print a predetermined pattern on a predetermined area of the wiping member and cause the application unit to apply the wiping liquid, and, then, to cause the detection unit to detect the ink on the predetermined area.

2. The printing apparatus according to claim 1, wherein the detection unit detects a concentration of the ink.

3. The printing apparatus according to claim 2, wherein the detection unit detects the concentration of the ink in the predetermined area by relative movement with the wiping unit.

4. The printing apparatus according to claim 1, wherein the predetermined pattern is a line extending in a predetermined direction.

5. The printing apparatus according to claim 4, wherein the predetermined pattern is formed with a plurality of the lines arranged side by side in a direction intersecting the predetermined direction.

6. The printing apparatus according to claim 5, wherein an interval between the lines is greater than a resolution of the detection unit.

7. The printing apparatus according to claim 4, wherein a width of the line is greater than a resolution of the detection unit.

8. The printing apparatus according to claim 4, wherein the control unit causes the application unit to apply the wiping liquid to the predetermined area again in a case when a width of the line detected by the detection unit is a first length, and does not cause the application unit to apply the wiping liquid in a case when the width is a second length, which is longer than the first length.

9. The printing apparatus according to claim 4, wherein the control unit fills the application unit with the wiping liquid in a case when a width of the line detected by the detection unit is a first length, and does not fill the application unit with the wiping liquid in a case when the width is a second length, which is longer than the first length.

10. The printing apparatus according to claim 9, wherein the application unit is filled with the wiping liquid and then the application unit is caused to apply the wiping liquid to the predetermined area again in a case when the width is the first length.

11. The printing apparatus according to claim 4, wherein the control unit provides a notification of an error in a case when a width of the line detected by the detection unit is less a threshold value.

12. The printing apparatus according to claim 1, wherein the control unit causes the application unit to apply the wiping liquid to the predetermined area again in a case when bleeding of the ink of the predetermined pattern is at a first amount, and does not cause the application unit to apply the wiping liquid in a case when the bleeding is at a second amount, which is greater than the first amount.

13. The printing apparatus according to claim 1, wherein the control unit fills the application unit with the wiping liquid in a case when bleeding of the ink of the predetermined pattern is at a first amount, and does not fill the application unit with the wiping liquid in a case when the bleeding is at a second amount, which is greater than the first amount.

14. The printing apparatus according to claim 13, wherein the control unit fills the application unit with the wiping liquid and then causes the application unit to apply the wiping liquid to the predetermined area again in a case when the bleeding is at the first amount.

15. The printing apparatus according to claim 1, the detection unit is an optical sensor, the detection unit detects an amount of received light from the wiping member before printing the predetermined pattern on the predetermined area and applying the wiping liquid, and wherein a notification of an error is provided in a case when the amount of received light is not within a predetermined range.

16. The printing apparatus according to claim 1, wherein the predetermined pattern is printed using a black ink.

17. The printing apparatus according to claim 1, wherein the wiping liquid is applied after the predetermined pattern is printed on the predetermined area.

18. The printing apparatus according to claim 1, wherein the predetermined pattern is printed after the wiping liquid is applied to the predetermined area.

19. A control method of controlling a printing apparatus that includes a printing unit configured with an ejection port surface for ejecting ink, and a wiping unit configured to wipe the ejection port surface using a wiping member by relative movement with the printing unit, the control method comprising:

printing a predetermined pattern, by the printing unit, on a predetermined area of the wiping member;

applying a wiping liquid to the wiping member after printing; and detecting the ink on the predetermined area after applying the wiping liquid.

20. The control method according to claim 19, further comprising:

detecting an amount of received light from the wiping member before printing; and providing a notification of an error in a case when the amount of received light is not within a predetermined range.

* * * * *